United States Patent
Chen et al.

(10) Patent No.: US 11,370,979 B2
(45) Date of Patent: Jun. 28, 2022

(54) FLUID CATALYTIC CRACKING PROCESS AND APPARATUS FOR MAXIMIZING LIGHT OLEFIN YIELD AND OTHER APPLICATIONS

(71) Applicant: LUMMUS TECHNOLOGY LLC, Bloomfield, NJ (US)

(72) Inventors: Liang Chen, Bloomfield, NJ (US); Peter Loezos, Sugar Land, TX (US); Rama Rao Marri, Katy, TX (US); Bryan Tomsula, Bloomfield, NJ (US); Jon A. Hood, Bloomfield, NJ (US); Hardik Singh, Bloomfield, NJ (US); Michael Dorsey, Bloomfield, NJ (US); Justin Breckenridge, Bloomfield, NJ (US)

(73) Assignee: LUMMUS TECHNOLOGY LLC, Bloomfield, NJ (US)

(*) Notice: Subject to any disclaimer, the term of this patent is extended or adjusted under 35 U.S.C. 154(b) by 0 days.

(21) Appl. No.: 17/242,487

(22) Filed: Apr. 28, 2021

(65) Prior Publication Data
US 2021/0246379 A1 Aug. 12, 2021

Related U.S. Application Data

(62) Division of application No. 16/511,355, filed on Jul. 15, 2019, now Pat. No. 11,015,130, which is a
(Continued)

(51) Int. Cl.
*C10G 51/02* (2006.01)
*B01J 8/18* (2006.01)
(Continued)

(52) U.S. Cl.
CPC .......... *C10G 51/026* (2013.01); *B01D 45/06* (2013.01); *B01D 45/08* (2013.01); *B01J 8/0055* (2013.01);
(Continued)

(58) Field of Classification Search
CPC .. C10G 51/026; C10G 11/18; C10G 2400/20; C10G 2400/30; C10G 11/182;
(Continued)

(56) References Cited

FOREIGN PATENT DOCUMENTS

| EP | 0489723 A2 | 6/1992 |
|---|---|---|
| GB | 874783 A | 8/1961 |
| JP | S59-206483 A | 11/1984 |

OTHER PUBLICATIONS

Notice of Reasons for Refusal issued in Japanese Application No. 2019-536468, dated Aug. 10, 2021 (5 pages).
(Continued)

*Primary Examiner* — Thuan D Dang
(74) *Attorney, Agent, or Firm* — Osha Bergman Watanabe & Burton LLP

(57) ABSTRACT

Apparatus and processes herein provide for converting hydrocarbon feeds to light olefins and other hydrocarbons. The processes and apparatus include, in some embodiments, feeding a hydrocarbon, a first catalyst and a second catalyst to a reactor, wherein the first catalyst has a smaller average particle size and is less dense than the second catalyst. A first portion of the second catalyst may be recovered as a bottoms product from the reactor, and a cracked hydrocarbon effluent, a second portion of the second catalyst, and the first catalyst may be recovered as an overhead product from the reactor. The second portion of the second catalyst may be separated from the overhead product, providing a first stream comprising the first catalyst and the hydrocarbon effluent and a second stream comprising the separated
(Continued)

second catalyst, allowing return of the separated second catalyst in the second stream to the reactor.

7 Claims, 13 Drawing Sheets

Related U.S. Application Data division of application No. 15/706,348, filed on Sep. 15, 2017, now Pat. No. 10,351,786.

(60) Provisional application No. 62/395,707, filed on Sep. 16, 2016.

(51) Int. Cl.
    *B01J 8/00*     (2006.01)
    *B01D 45/06*     (2006.01)
    *B01D 45/08*     (2006.01)
    *B01J 8/24*     (2006.01)
    *B01J 8/26*     (2006.01)
    *C10G 11/18*     (2006.01)

(52) U.S. Cl.
    CPC .......... *B01J 8/0065* (2013.01); *B01J 8/1845* (2013.01); *B01J 8/1863* (2013.01); *B01J 8/24* (2013.01); *B01J 8/26* (2013.01); *C10G 11/18* (2013.01); *B01J 2208/0038* (2013.01); *B01J 2208/00362* (2013.01); *B01J 2208/00752* (2013.01); *B01J 2208/00761* (2013.01); *B01J 2208/00991* (2013.01); *C10G 2400/20* (2013.01); *C10G 2400/30* (2013.01)

(58) Field of Classification Search
    CPC .................. C10G 11/187; C10G 55/06; C10G 2300/1037; C10G 2300/202; C10G 2400/22; C10G 11/02; C10G 2300/1077; C10G 2400/02; C10G 51/02; C10G 51/06; B01D 45/06; B01D 45/08; B01J 8/0055; B01J 8/0065; B01J 8/1845; B01J 8/1863; B01J 8/24; B01J 8/26; B01J 2208/00362; B01J 2208/0038; B01J 2208/00752; B01J 2208/00761; B01J 2208/00991; B01J 8/0015; B01J 8/005; B01J 29/40; C07C 2/864; C07C 4/06
See application file for complete search history.

(56) References Cited

OTHER PUBLICATIONS

Examination Report issued in the Patent Office at the Secretariat General for Cooperation Council in Application No. 2020-40091, dated Aug. 29, 2021 (5 pages).
Examination Report issued in Indian Application No. 202028045930, dated Oct. 26, 2021 (5 pages).

FLUID CATALYTIC CRACKING PROCESS AND APPARATUS FOR MAXIMIZING LIGHT OLEFIN YIELD AND OTHER APPLICATIONS

FIELD OF THE DISCLOSURE

Embodiments herein generally relate to systems and processes for enhancing the productivity and/or flexibility of mixed catalyst systems. Some embodiments disclosed herein relate to a fluid catalytic cracking apparatus and process for maximizing the conversion of a heavy hydrocarbon feed, such as vacuum gas oil and/or heavy oil residues into very high yield of light olefins, such as propylene and ethylene, aromatics and gasoline with high octane number.

BACKGROUND

In recent times, production of light olefins via fluid catalytic cracking (FCC) processes has been considered one of the most attractive propositions. Additionally, there is an ever increasing demand for petrochemical building blocks such as propylene, ethylene, and aromatics (benzene, toluene, xylenes, etc.). Further, integration of petroleum refineries with a petrochemicals complex has become a preferred option for both economic and environmental reasons.

Global trends also show that there is increased demand for middle distillates (diesel) than that of gasoline product. In order to maximize middle distillates from FCC process, it is required to operate FCC at lower reactor temperature and a different catalyst formulation. The downside of such change is decreased light olefins yield because of FCC unit operating at much lower reactor temperature. This will also reduce feedstock for Alkylation units.

Several fluidized bed catalytic processes have been developed over the last two decades, adapting to the changing market demands. For example, U.S. Pat. No. 7,479,218 discloses a fluidized catalytic reactor system in which a riser-reactor is divided into two sections of different radii in order to improve the selectivity for light olefins production. The first part of the riser reactor with lesser radii is employed for cracking heavy feed molecules to naphtha range. The enlarged radii portion, the second part of the riser reactor is used for further cracking of naphtha range products into light olefins such as propylene, ethylene, etc. Though the reactor system concept is fairly simple, the degree of selectivity to light olefins is limited for the following reasons: (1) the naphtha range feed streams contact partially coked or deactivated catalyst; (2) the temperature in the second part of the reaction section is much lower than the first zone because of the endothermic nature of the reaction in both sections; and (3) lack of the high activation energy required for light feed cracking as compared to that of heavy hydrocarbons.

U.S. Pat. Nos. 6,106,697, 7,128,827, and 7,323,099 employ two stage fluid catalytic cracking (FCC) units to allow a high degree of control for selective cracking of heavy hydrocarbons and naphtha range feed streams. In the $1^{st}$ stage FCC unit, consisting of a riser reactor, stripper and regenerator for converting gas oil/heavy hydrocarbon feeds into naphtha boiling range products, in the presence of Y-type large pore zeolite catalyst. A $2^{nd}$ stage FCC unit with a similar set of vessels/configuration is used for catalytic cracking of recycled naphtha streams from the $1^{st}$ stage. Of course, the $2^{nd}$ stage FCC unit employs a ZSM-5 type (small pore zeolite) catalyst to improve the selectivity to light olefins. Though this scheme provides a high degree of control over the feed, catalyst and operating window selection and optimization in a broad sense, the $2^{nd}$ stage processing of naphtha feed produces very little coke that is insufficient to maintain the heat balance. This demands heat from external sources to have adequate temperature in the regenerator for achieving good combustion and to supply heat for feed vaporization and endothermic reaction. Usually, torch oil is burned in the $2^{nd}$ stage FCC regenerator, which leads to excessive catalyst deactivation due to higher catalyst particle temperatures and hot spots.

U.S. Pat. No. 7,658,837 discloses a process and device to optimize the yields of FCC products by utilizing a part of a conventional stripper bed as a reactive stripper. Such reactive stripping concept of second reactor compromises the stripping efficiency to some extent and hence may lead to increased coke load to regenerator. The product yield and selectivity is also likely to be affected due to contact of the feed with coked or deactivated catalyst. Further, reactive stripper temperatures cannot be changed independently because the riser top temperature is directly controlled to maintain a desired set of conditions in the riser.

US2007/0205139 discloses a process to inject hydrocarbon feed through a first distributor located at the bottom section of the riser for maximizing gasoline yield. When the objective is to maximize light olefins, the feed is injected at the upper section of the riser through a similar feed distribution system with an intention to decrease the residence time of hydrocarbon vapors in the riser.

WO2010/067379 aims at increasing propylene and ethylene yields by injecting $C_4$ and olefinic naphtha streams in the lift zone of the riser below the heavy hydrocarbon feed injection zone. These streams not only improve the light olefins yield but also act as media for catalyst transport in place of steam. This concept helps in reducing the degree of thermal deactivation of the catalyst. However, this lacks in flexibility of varying operating conditions such as temperature and WHSV in the lift zone, which are critical for cracking of such light feed steams. This is likely to result in inferior selectivity to the desired light olefins.

U.S. Pat. No. 6,869,521 discloses that contacting a feed derived from FCC product (particularly naphtha) with a catalyst in a second reactor operating in fast fluidization regime is useful for promoting hydrogen transfer reactions and also for controlling catalytic cracking reactions.

U.S. Pat. No. 7,611,622 discloses an FCC process employing dual risers for converting a $C_3/C_4$ containing feedstock to aromatics. The first and second hydrocarbon feeds are supplied to the respective $1^{st}$ and $2^{nd}$ risers in the presence of gallium enriched catalyst and the $2^{nd}$ riser operates at higher reaction temperature than the first.

U.S. Pat. No. 5,944,982 discloses a catalytic process with dual risers for producing low sulfur and high octane gasoline. The second riser is used to process recycle the heavy naphtha and light cycle oils after hydro-treatment to maximize the gasoline yield and octane number.

US20060231461 discloses a process that maximizes production of light cycle oil (LCO) or middle distillate product and light olefins. This process employs a two reactor system where the first reactor (riser) is used for cracking gas oil feed into predominantly LCO and a second concurrent dense bed reactor is used for cracking of naphtha recycled from the first reactor. This process is limited by catalyst selectivity and lacks in the desired level of olefins in naphtha due to operation of the first reactor at substantially lower reaction temperatures.

U.S. Pat. No. 6,149,875 deals with removal of feed contaminants such as concarbon and metals with adsorbent. The FCC catalyst is separated from adsorbent using the differences between transport/terminal velocity of the FCC catalyst and adsorbent.

U.S. Pat. No. 7,381,322 disclosed an apparatus and process to separate catalyst from a metal adsorbent in stripper cum separator, before a regeneration step for eliminating the adverse effects of contaminant metals deposited on the adsorbent. This patent employs the difference in minimum/bubbling velocity differences and the application is mainly to segregate FCC catalyst from adsorbent.

SUMMARY

It has been found that it is possible to use a two-reactor scheme to crack hydrocarbons, including cracking of a $C_4$, lighter $C_5$ fraction, naphtha fraction, methanol, etc. for the production of light olefins, where the two-reactor scheme does not have limitations on selectivity and operability, meets heat balance requirements, and also maintains a low piece count. Select embodiments disclosed herein use a conventional riser reactor in combination with a mixed flow (e.g., including both counter-current and co-current catalyst flows) fluidized bed reactor designed for maximizing light olefins production. The effluents from the riser reactor and mixed flow reactor are processed in a common catalyst disengagement vessel, and the catalysts used in each of the riser reactor and the mixed flow reactor may be regenerated in a common catalyst regeneration vessel. This flow scheme is effective for maintaining a high cracking activity, overcomes the heat balance problems, and also improves yield and selectivity of light olefins from various hydrocarbon streams, yet simplifies the product quenching and unit hardware, as will be described in more detail below.

In one aspect, embodiments disclosed herein relate to a process for the conversion or catalytic cracking of hydrocarbons. The process may include feeding a hydrocarbon, a first particle and a second particle to a reactor, where the first particle has a smaller average particle size and/or is less dense than the second particle, and where the first and second particles may be catalytic or non-catalytic. A first portion of the second particle may be recovered as a bottoms product from the reactor; and a cracked hydrocarbon effluent, a second portion of the second particle, and the first particle may be recovered as an overhead product from the reactor. The second portion of the second particle may be separated from the overhead product to provide a first stream comprising the first particle and the hydrocarbon effluent and a second stream comprising the separated second particle, allowing return of the separated second particle in the second stream to the reactor.

In another aspect, embodiments disclosed herein relate to a system for the catalytic cracking of hydrocarbons. The system may include a first reactor for contacting a first and a second cracking catalyst with a hydrocarbon feedstock to convert at least a portion of the hydrocarbon feedstock to lighter hydrocarbons. An overhead product line provides for recovering from the first reactor a first stream comprising first cracking catalyst, a first portion of the second cracking catalyst, and hydrocarbons. A bottoms product line provides for recovering from the first reactor a second stream comprising a second portion of the second cracking catalyst. A separator may be used for separating second cracking catalyst from the first stream, producing a hydrocarbon effluent comprising hydrocarbons and the first cracking catalyst. A feed line is provided for returning separated second cracking catalyst from the separator to the first reactor.

The system for catalytic cracking of hydrocarbons may also include a riser reactor for contacting a mixture of the first cracking catalyst and the second cracking catalyst with a second hydrocarbon feedstock to convert at least a portion of the second hydrocarbon feedstock to lighter hydrocarbons and recover a riser reactor effluent comprising the lighter hydrocarbons and the mixture of the first cracking catalyst and the second cracking catalyst. A second separator may be provided for separating the second cracking catalyst from the hydrocarbon effluent and for separating the mixture of first and second cracking catalysts from the riser reactor effluent. A catalyst regenerator for regenerating first and second cracking catalyst recovered in the second separator and the second portion of the first cracking catalyst recovered in the bottoms product line may also be used.

In another aspect, embodiments disclosed herein relate to a process for the conversion of hydrocarbons. The process may include: feeding a first catalyst to a reactor; feeding a second catalyst to the reactor, wherein the first catalyst has a smaller average particle size and/or is less dense than the first catalyst, and feeding a hydrocarbon feedstock to the reactor. An overhead effluent may be recovered from the reactor, the effluent including cracked hydrocarbon, the first catalyst, and the second catalyst. The second catalyst may be separated from the overhead product to provide a first stream comprising the first catalyst and the hydrocarbon effluent and a second stream comprising the separated second catalyst, allowing return of the separated second catalyst in the second stream to the reactor.

In another aspect, embodiments herein are directed toward a separator for separating catalysts or other particles based on size and/or density difference. The separator may have a minimum of one inlet and may also have a minimum of two outlets for separating particles from carrier gases. The carrier gas enters the separator with the particles whereupon inertial, centrifugal and/or gravitational forces may be exerted on the particles such that a portion of the particles and carrier gas are collected in the first outlet and a portion of the particles along with the carrier gas are collected in the second outlet. The combination of forces in the separator may have the effect of enriching an outlet stream in particle size and/or density versus the inlet concentration. The separator may have additional carrier gas distribution or fluidization inside of the vessel/chamber to exert additional forces on the particles which may facilitate enhanced classification.

In another aspect, embodiments herein are directed toward an inertial separator for separating catalysts or other particles based on size and/or density. The inertial separator may include an inlet for receiving a mixture comprising a carrier gas, a first particle type, and a second particle type. Each particle type may have an average particle size and a particle size distribution, which may be different or overlapping, and an average density. The second particle type may have an average particle size and/or average density greater than the first particle type. The inertial separator may include a U-shaped conduit including a first vertical leg, a base of the U-shape, and a second vertical leg. The U-shaped conduit may fluidly connect the inlet via the first vertical leg to a first outlet and a second outlet, the first outlet being connected proximate the base of the U-shaped conduit and the second outlet being connected to the second vertical leg. The U-shaped inertial separator may be configured to: separate at least a portion of the second particle type from the carrier gas and the first particle type, recover the second particle type via the first outlet, and recover the carrier gas and the first particle type via the second outlet. The separator may also include a distributor disposed within or proximate the second outlet for introducing a fluidizing gas, facilitating additional separation of the first particle type from the second particle type. The separator, in some embodiments, may be configured such that a cross-sectional area of the U-shaped conduit or a portion thereof is adjustable. For example, in some embodiments the separator may include a movable baffle disposed within one or more sections of the U-shaped conduit.

In another aspect, embodiments herein are directed toward an inertial separator for separating catalysts or other particles based on size and/or density as above. The inertial separator may include an inlet horizontal conduit which traverses a chamber before being deflected by a baffle. The chamber is connected to a first vertical outlet and a first horizontal outlet. The baffle may be located in the middle, proximate the inlet, or proximate the outlet of the chamber. The baffle may be at an angle or moveable such that to deflect more or less catalyst particles. The baffle chamber separator may be configured to: separate at least a portion of the second particle type from the carrier gas and the first particle type, recover the second particle type via the first vertical outlet and recover the carrier gas and the first particle type via the first horizontal outlet. The separator may also include a distributor disposed within or proximate the first vertical outlet for introducing a fluidizing gas, facilitating additional separation of the first particle type from the second particle type.

In another aspect, embodiments herein are directed toward an inertial separator for separating catalysts or other particles based on size and/or density as above. The inertial separator may include a vertical inlet connected to a chamber where one or more vertical sides of the chamber are equipped with narrow slot outlets, which may be described as louvers. The number of louvers may vary depending on the application and the angle of the louver may be adjustable in order to control the amount of vapor leaving the louver outlets. The chamber is also connected to a first vertical outlet at the bottom of the chamber. The louver separator may be configured to: separate at least a portion of the second particle type from the carrier gas and the first particle type, recover the second particle type via the first vertical outlet and recover the carrier gas and the first particle type via the louver outlets. The separator may also include a distributor disposed within or proximate the first vertical outlet for introducing for introducing a fluidizing gas, facilitating additional separation of the first particle type from the second particle type.

The above described separators may also be used in association with reactors, regenerators, and catalyst feed systems to enhance system performance and flexibility.

In one aspect, embodiments disclosed herein relate to a process for the conversion of hydrocarbons. The process may include regenerating a catalyst mixture comprising a first catalyst and a second particle in a regenerator, wherein the first catalyst has a smaller average particle size and/or is less dense than the second particle, and wherein the second particle may be catalytic or non-catalytic. The catalyst mixture and hydrocarbons may be fed to a riser reactor to convert at least a portion of the hydrocarbons and recover a first effluent comprising the catalyst mixture and converted hydrocarbons. The catalyst mixture may also be fed to a second reactor. Feeding a hydrocarbon feedstock to the second reactor and fluidizing the catalyst mixture may contact the hydrocarbon feedstock with the catalyst mixture to convert the hydrocarbons and provide for recovering an overhead product from the second reactor comprising the second particle, the first catalyst, and a reacted hydrocarbon product. The second particle may then be separated from the overhead product to provide a first stream comprising the first catalyst and the reacted hydrocarbon product and a second stream comprising the separated second particle, returning the separated second particle in the second stream to the reactor.

In another aspect, embodiments disclosed herein relate to a process for the conversion of hydrocarbons. The process may include withdrawing a mixture comprising a first catalyst and a second catalyst from a catalyst regenerator and feeding the mixture and hydrocarbons to a riser reactor to convert at least a portion of the hydrocarbons and recover a first effluent comprising the catalyst mixture and converted hydrocarbons, wherein the first catalyst has a smaller average particle size and/or is less dense than the second catalyst. The process may also include withdrawing the mixture comprising a first catalyst and a second catalyst from the catalyst regenerator and feeding the mixture to a catalyst separation system, fluidizing the mixture comprising the first catalyst and the second catalyst with a fluidization medium, and separating the first catalyst from the second catalyst in the catalyst separation system to recover a first stream comprising the first catalyst and the fluidization medium and a second stream comprising the second catalyst. A hydrocarbon feedstock and either the first stream or the second stream may then be fed to a reactor to react at least a portion of the hydrocarbon to produce a converted hydrocarbon.

In another aspect, embodiments disclosed herein relate to a process for the conversion of hydrocarbons. The process may include feeding a hydrocarbon feedstock and a catalyst mixture comprising a first catalyst and a second catalyst to a riser reactor, wherein the first catalyst has a smaller average particle size and/or is less dense than the second catalyst. An effluent from the riser reactor may then be separated to recover a first stream comprising the first catalyst and converted hydrocarbon feedstock and a second stream comprising the second catalyst, and the second stream may be fed to the riser reactor.

In another aspect, embodiments disclosed herein relate to a process for the conversion of hydrocarbons. The process may include withdrawing a mixture comprising a first catalyst and a second catalyst from a catalyst regenerator and feeding the mixture to a catalyst feed/separation system, wherein the first catalyst has a smaller average particle size and/or is less dense than the second catalyst. The first catalyst may be separated from the second catalyst in the catalyst feed/separation system to produce a first stream comprising the first catalyst and a second stream comprising the second catalyst. A hydrocarbon feedstock and either the first stream or the second stream may then be fed to a riser reactor to react at least a portion of the hydrocarbon to produce a converted hydrocarbon.

In another aspect, embodiments disclosed herein relate to a system for the conversion of hydrocarbons. The system may include a catalyst regenerator, and a first catalyst feed line for withdrawing a mixture comprising a first catalyst and a second catalyst from the catalyst regenerator and feeding the mixture to a riser reactor, wherein the first catalyst has a smaller average particle size and/or is less dense than the second catalyst. The system may also include a second catalyst feed line for withdrawing the mixture comprising a first catalyst and a second catalyst from the catalyst regenerator and feeding the mixture to a catalyst separation system, and a fluidization medium feed line for fluidizing the mixture withdrawn via the second catalyst feed line with a fluidization medium and separating the first catalyst from the second catalyst in the catalyst separation system to recover a first stream comprising the first catalyst and the fluidization medium and a second stream comprising the second catalyst. A reactor may be provided for contacting a hydrocarbon feedstock and either the first stream or the second stream to react at least a portion of the hydrocarbon to produce a converted hydrocarbon.

In another aspect, embodiments disclosed herein relate to a system for the conversion of hydrocarbons. The system may include a riser reactor for contacting a hydrocarbon feedstock with a catalyst mixture comprising a first catalyst and a second catalyst, wherein the first catalyst has a smaller average particle size and/or is less dense than the second catalyst. A catalyst separation system is provided for separating a riser reactor effluent to recover a first stream comprising the first catalyst and converted hydrocarbon feedstock and a second stream comprising the second catalyst. A flow line feeds the second stream to the riser reactor.

In another aspect, embodiments disclosed herein relate to a system for the conversion of hydrocarbons. The system may include a catalyst withdrawal line for withdrawing a mixture comprising a first catalyst and a second catalyst from a catalyst regenerator and feeding the mixture to a catalyst feed/separation system, wherein the first catalyst has a smaller average particle size and/or is less dense than the second catalyst. The catalyst feed/separation system separates the first catalyst from the second catalyst in the catalyst feed/separation system to produce a first stream comprising the first catalyst and a second stream comprising the second catalyst. A riser reactor contacts a hydrocarbon feedstock and either the first stream or the second stream to react at least a portion of the hydrocarbon to produce a converted hydrocarbon.

The apparatus and processes disclosed herein use significantly different technique than disclosed in the above patents (such as U.S. Pat. Nos. 6,149,875 and 7,381,322) to separate particulate mixtures. The purpose of the present disclosure is also different; the prior art disclosures focus on removing the contaminants from the catalyst by introducing an adsorbent. However, the present invention aims at improving the conversion, selectivity and heat balance by concentrating a selected catalyst in a reactor, such as concentrating the ZSM-5/11 in the second reactor.

In summary, most of the state of the art included dual riser/reactor configurations or two stage fluid catalytic cracking process schemes/apparatus. The second/parallel reactor used for processing light feed (naphtha or/and C4 streams) are either concurrent pneumatic flow riser type or dense bed reactors. It is well known in the art that ZSM-5 is preferable catalyst/additive to convert naphtha/C4 streams into propylene and ethylene. However, in processes employing two reactors, the second reactor also receives Y-zeolite catalyst with small fractions of ZSM-5 additive. In other process schemes, FCC type reactor-regenerator concepts are employed for maximizing light olefins from naphtha/C4 streams. Such schemes pose heat balance problems due to insufficient coke production. The processes and systems disclosed herein considers separating catalysts, such as ZSM-5 or ZSM-11 additive from Y-zeolite & ZSM-5/ZSM-11, in a mixture, so as to have optimal concentration of ZSM-5 or 11 in the second reactor processing light feed. In addition, integration of said additional/second reactor with a conventional FCC unit essentially helps overcoming these drawbacks (product selectivity and heat balance in particular) of the prior part and substantially increases the overall conversion and light olefins yield and increases the capability to process heavier feedstocks.

Other aspects and advantages will be apparent from the following description and the appended claims.

DETAILED DESCRIPTION

Figure 1:
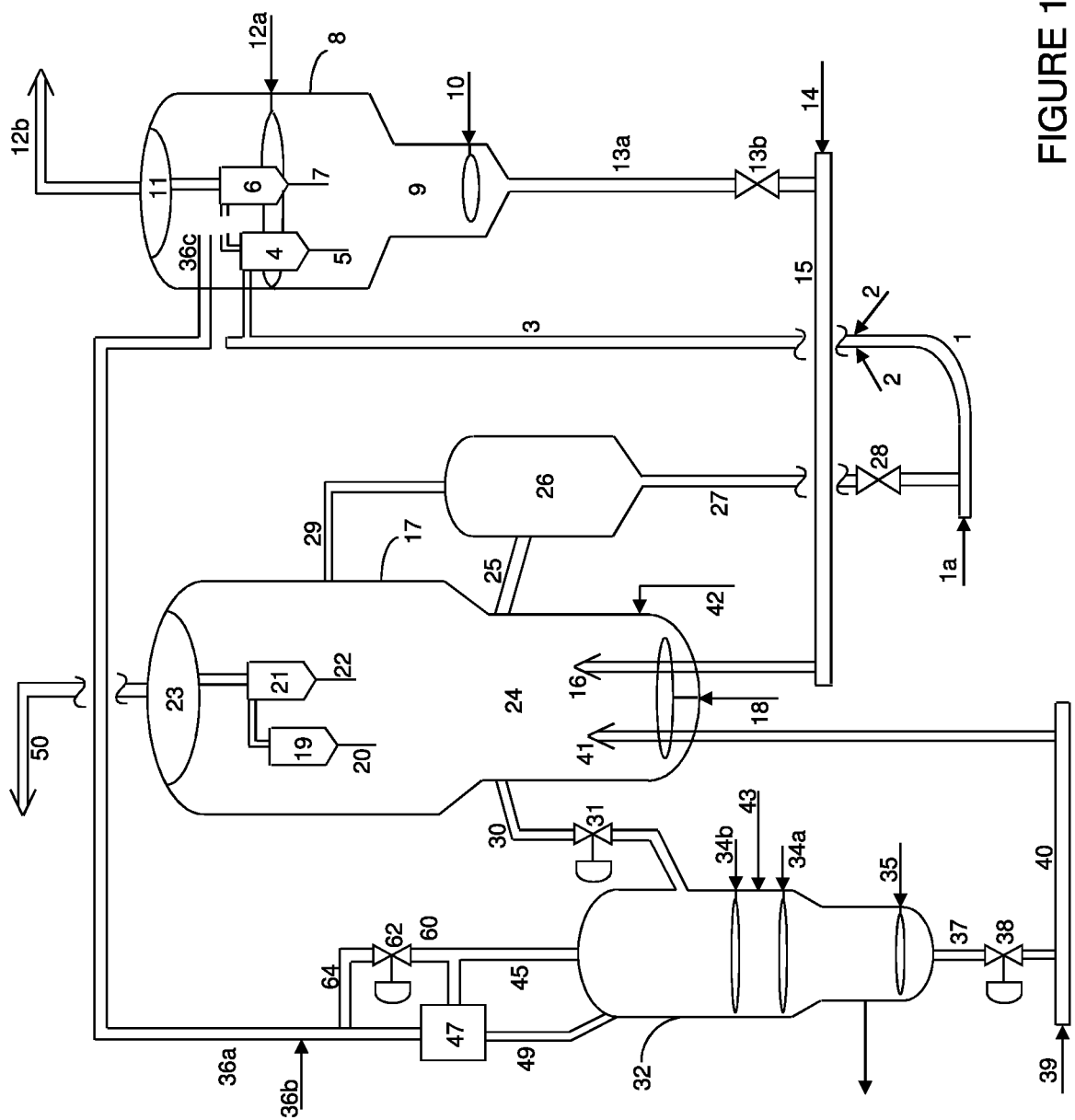
FIG. 1 is a simplified process flow diagram of a system for cracking hydrocarbons and producing light olefins according to one or more embodiments disclosed herein.

As used herein, the terms "catalyst" and "particle" and like terms may be used interchangeably. Summarized above, and as further described below, embodiments herein separate mixed particulate materials based on size and/or density to achieve an advantageous effect in a reactor system. The particles or particulate materials used to facilitate catalytic or thermal reaction may include catalysts, absorbents, and/or heat transfer materials having no catalytic activity, for example.

In one aspect, embodiments herein relate to a fluid catalytic cracking apparatus and process for maximizing the conversion of a heavy hydrocarbon feed, such as vacuum gas oil and/or heavy oil residues into very high yield of light olefins, such as propylene and ethylene, aromatics and gasoline with high octane number or middle distillates, while concurrently minimizing the yield of heavier bottom product. To accomplish this goal, a secondary reactor, which may be a mixed flow reactor (including both co-current and counter-current flow of particles with respect to vapor flow) or a catalyst-concentrating reactor, can be integrated with a conventional fluid catalytic cracking reactor, such as a riser reactor. A heavy hydrocarbon feed is catalytically cracked to naphtha, middle distillates and light olefins in the riser reactor, which is a pneumatic flow co-current type reactor. To enhance the yields and selectivity to light olefins (ethylene and propylene), cracked hydrocarbon products from the riser reactor, such as $C_4$ and naphtha range hydrocarbons (olefins and paraffins), may be recycled and processed in the secondary reactor (the mixed flow reactor or the catalyst-concentrating reactor). Alternatively, or additionally, external feed streams, such as $C_4$, naphtha, or other hydrocarbon fractions from other processes such as a steam cracker, metathesis reactor, or delayed coking unit, and naphtha range streams, such as straight run naphtha or from delayed coking, visbreaking or natural gas condensates, among other hydrocarbon feedstocks, may be processed in the secondary reactor to produce light olefins, such as ethylene and propylene. The integration of the secondary reactor with a conventional FCC riser reactor according to embodiments disclosed herein may overcome the drawbacks of prior processes, may substantially increase the overall conversion and light olefins yield, and/or may increases the capability to process heavier feedstocks.

Integration of the secondary reactor with a conventional FCC riser reactor according to embodiments disclosed herein may be facilitated by (a) using a common catalyst regeneration vessel, (b) using two types of catalyst, one being selective for cracking heavier hydrocarbons and the other being selective for the cracking of $C_4$ and naphtha range hydrocarbons for the production of light olefins, and (c) using a mixed flow reactor or a catalyst-concentrating reactor in a flow regime that will partially separate the two types of catalysts, favoring the contact of the $C_4$s or naphtha feed with the catalyst selective for cracking the same and producing light olefins.

To enhance the operation window of the secondary reactor, and to provide greater process flexibility, the secondary reactor may be operated in a flow regime to entrain the catalyst selective for cracking heavier hydrocarbons, and to entrain a portion of the catalyst selective for the cracking of $C_4$ and naphtha range hydrocarbons. The cracked hydrocarbon products and the entrained catalysts are then fed to a separator to separate the catalyst selective for the cracking of $C_4$ and naphtha range hydrocarbons from the cracked hydrocarbon products and the catalyst selective for cracking heavier hydrocarbons. This solids separation vessel is an external vessel to the reactor and is operated at hydrodynamic properties that enhance the separation of the two types of catalyst based on their physical properties, such as particle size and/or density. The separated catalyst, selective for the cracking of $C_4$ and naphtha range hydrocarbons, may then be returned to the reactor for continued reaction and providing an enhanced concentration of the catalyst selective for the cracking of $C_4$ and naphtha range hydrocarbons within the reactor, improving selectivity of the overall process while also improving the overall process flexibility due to the enhanced operating window.

As noted above, the cracking system may utilize two types of catalysts, each favoring a different type of hydrocarbon feed. The first cracking catalyst may be a Y-type zeolite catalyst, an FCC catalyst, or other similar catalysts useful for cracking heavier hydrocarbon feedstocks. The second cracking catalyst may be a ZSM-5 or ZSM-11 type catalyst or similar catalyst useful for cracking $C_4$s or naphtha range hydrocarbons and selective for producing light olefins. To facilitate the two-reactor scheme disclosed herein, the first cracking catalyst may have a first average particle size and density, and may be smaller and/or lighter than those for the second cracking catalyst, such that the catalysts may be separated based on density and/or size (e.g., based on terminal velocity or other characteristics of the catalyst particles).

In the catalyst regeneration vessel, spent catalyst recovered from both the riser reactor and the secondary reactor is regenerated. Following regeneration, a first portion of the mixed catalyst may be fed from the regeneration vessel to a riser reactor (co-current flow reactor). A second portion of the mixed catalyst may be fed from the regeneration vessel to the secondary reactor.

In the co-current flow reactor, a first hydrocarbon feed is contacted with a first portion of the regenerated catalyst to crack at least a portion of the hydrocarbons to form lighter hydrocarbons. An effluent may then be recovered from the co-current flow reactor, the effluent comprising a first cracked hydrocarbon product and a spent mixed catalyst fraction.

In some embodiments, the secondary reactor is operated in a fluidization regime sufficient to entrain the first cracking catalyst, and the second cracking catalyst with the hydrocarbon products recovered as an effluent from the secondary reactor overhead outlet. The effluent is then fed to a separator to separate the cracked hydrocarbon products and the first cracking catalyst from the second cracking catalyst.

The vapor/first cracking catalyst stream recovered from the separator may then be forwarded for separation. The second cracking catalyst recovered from the separator may be recycled back to the secondary reactor for continued reaction, as noted above.

The first effluent (cracked hydrocarbons and spent mixed catalyst from the riser reactor) and the second effluent (cracked hydrocarbons and separated first cracking catalyst from the secondary reactor) may both be fed to a disengagement vessel to separate the spent mixed catalyst fraction and the separated first cracking catalyst from the first and second cracked hydrocarbon products. The cracked hydrocarbon products, including light olefins, $C_4$ hydrocarbons, naphtha range hydrocarbons, and heavier hydrocarbons may then be separated to recover the desired products or product fractions.

Thus, processes disclosed herein integrate a secondary mixed-flow or catalyst-concentrating reactor, external solids separator, and a riser reactor, with common product separations and catalyst regeneration, where the catalysts used in the secondary reactor is highly selective for cracking C4 and naphtha range hydrocarbons to produce light olefins. The common catalyst regeneration provides for heat balance, and the common product separation (disengagement vessel, etc.) provides for simplicity of operations and reduced piece count, among other advantages.

Referring now to FIG. 1, a simplified process flow diagram of systems for cracking hydrocarbons and producing light olefins according to embodiments disclosed herein is illustrated. The system includes a two-reactor configuration for maximizing yield of propylene and ethylene from petroleum residue feedstocks or other hydrocarbon streams. The first reactor 3 may be a riser reactor for cracking heavier hydrocarbon feeds, for example. The second reactor 32 is a fluidized bed reactor, which may be equipped with baffles or internals. The $C_4$ olefins and/or light naphtha products from the first reactor 3 or similar feed streams from external sources may be processed in the second reactor 32 to enhance the yield of light olefins, including propylene and ethylene, and aromatics/high octane gasoline.

A heavy petroleum residue feed is injected through one or more feed injectors 2 located near the bottom of first reactor 3. The heavy petroleum feed contacts hot regenerated catalyst introduced through a J-bend 1. The catalyst fed to the first reactor 3 is a catalyst mixture, including a first catalyst selective for cracking heavier hydrocarbons, such as a Y-type zeolite based catalyst, and a second catalyst selective for the cracking of $C_4$ and naphtha range hydrocarbons for the production of light olefins, such as a ZSM-5 or ZSM-11, which may also be used in combination with other catalysts. The first and second catalysts may be different in one or both particle size and density. A first catalyst, such as the Y-type based zeolite, may have a particle size in the range of 20-200 microns and an apparent bulk density in the range of 0.60-1.0 g/ml. A second catalyst, such as ZSM-5 or ZSM-11, may have a particle size in the range of 20-350 microns and an apparent bulk density in the range of 0.7-1.2 g/ml.

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 17. The pressure in first reactor 3 is typically in the range from about 1 barg to about 5 barg.

After the major part of the cracking reaction is completed, the mixture of products, unconverted feed vapors, and spent catalyst flow into a two stage cyclone system housed in cyclone containment vessel 8. The two-stage cyclone system includes a primary cyclone 4, for separating spent catalyst from vapors. The spent catalyst is discharged into stripper 9 through primary cyclone dip leg 5. Fine catalyst particles entrained with the separated vapors from primary cyclone 4 and product vapors from second reactor 32, introduced via flow line 36a and a single stage cyclone 36c, are separated in second stage cyclone 6. The catalyst mixture collected is discharged into stripper 9 via dip leg 7. The vapors from second stage cyclone 6 are vented through a secondary cyclone outlet 12b, which may be connected to plenum 11, and are then routed to a main fractionator/gas plant (not shown) for recovery of products, including the desired olefins. If necessary, the product vapors are further cooled by introducing light cycle oil (LCO) or steam via distributor line 12a as a quench media.

The spent catalyst recovered via dip legs 5, 7 undergoes stripping in stripper bed 9 to remove interstitial vapors (the hydrocarbon vapors trapped between catalyst particles) by countercurrent contacting of steam, introduced to the bottom of stripper 9 through a steam distributor 10. The spent catalyst is then transferred to regenerator 17 via the spent catalyst standpipe 13a and lift line 15. Spent catalyst slide valve 13b, located on spent catalyst standpipe 13a is used for controlling catalyst flow from stripper 9 to regenerator 17. A small portion of combustion air or nitrogen may be introduced through a distributor 14 to help smooth transfer of spent catalyst.

Coked or spent catalyst is discharged through spent catalyst distributor 16 in the center of the dense regenerator bed 24. Combustion air is introduced by an air distributor 18 located at the bottom of regenerator bed 24. Coke deposited on the catalyst is then burned off in regenerator 17 via reaction with the combustion air. Regenerator 17, for example, may operate at a temperature in the range from about 640° C. to about 750° C. and a pressure in the range from about 1 barg to about 5 barg. The catalyst fines entrained along with flue gas are collected in first stage cyclone 19 and second stage cyclone 21 and are discharged into the regenerator catalyst bed through respective dip legs 20, 22. The flue gas recovered from the outlet of second stage cyclone 21 is directed to flue gas line 50 via regenerator plenum 23 for downstream waste heat recovery and/or power recovery.

A first part of the regenerated catalyst mixture is withdrawn via regenerated catalyst standpipe 27, which is in flow communication with J bend 1. The catalyst flow from regenerator 17 to reactor 3 may be regulated by a slide valve 28 located on regenerated catalyst standpipe 27. The opening of slide valve 28 is adjusted to control the catalyst flow to maintain a desired top temperature in reactor 3.

In addition to lift steam, a provision is also made to inject feed streams such as $C_4$ olefins and naphtha or similar external streams as a lift media to J bend 1 through a gas distributor 1a located at the Y-section for enabling smooth transfer of regenerated catalyst from J bend 1 to reactor 3. J bend 1 may also act as a dense bed reactor for cracking $C_4$ olefins and naphtha streams into light olefins at conditions favorable for such reactions, such as a WHSV of 0.5 to 50 $h^{-1}$, a temperature of 640° C. to 750° C., and residence times from 3 to 10 seconds.

A second part of the regenerated catalyst mixture is withdrawn into a second reactor 32 through a standpipe 30. A slide valve 31 may be used to control the catalyst flow from regenerator 17 to second reactor 32 based on a vapor outlet temperature set point. $C_4$ olefins and naphtha streams are injected into the bottom section of the catalyst bed through one or more feed distributors 34 (34a, 34b), either in liquid or vapor phase. Second reactor 32 operates in a mixed flow fashion, where a portion of the regenerated catalyst flows downward (from the top to the bottom of the reactor bed) and a portion of the regenerated catalyst mixture and the feed hydrocarbon stream flows upward (from the bottom to the top of the reactor bed).

Second reactor 32 may be equipped with baffles or structured internals (not shown) that help intimate contact and mixing of catalyst and feed molecules. These internals may also help in minimizing channeling, bubble growth, and/or coalescence. Second reactor 32 may also be enlarged at different sections along the length to maintain a constant or desired superficial gas velocity within the sections.

After the reaction is completed, the catalyst is stripped at the bottommost portion of second reactor 32 to separate entrained hydrocarbon feed/products using steam as a stripping media introduced through distributor 35. The spent catalyst recovered at the bottom of reactor 32 is then transferred to regenerator 17 via standpipe 37 and lift line 40 through a spent catalyst distributor 41. Combustion air or nitrogen may be introduced through distributor 39 to enable smooth transfer of catalyst to regenerator 17. Slide valve 38 may be used to control the catalyst flow from second reactor 32 to regenerator 17. Spent catalyst from both reactors 3, 32 is then regenerated in the common regenerator 17, operating in a complete combustion mode.

As noted above, second reactor 32 utilizes two different catalysts that may differ in one or both of particle size and density, such as a lighter and smaller Y-type zeolite or FCC catalyst and a larger and/or denser ZSM-5/ZSM-11 shape-selective pentacil small pore zeolite. The superficial gas velocity in second reactor 32 is maintained such that essentially all or a large portion of the lighter, smaller catalyst (e.g., Y-type zeolite/FCC catalyst) and a portion of the heavier, larger catalyst (e.g., ZSM-5/ZSM-11) is carried out of the reactor with the cracked hydrocarbons and steam recovered via flow line 45. A portion of the larger and/or denser catalyst may be retained within the reactor 32, forming a dense bed toward the lower portion of the reactor, as noted above.

The effluent from reactor 32 recovered via flow line 45 may thus include cracked hydrocarbon products, unreacted hydrocarbon feedstock, steam (stripping media), and a catalyst mixture, including essentially all of the lighter and/or smaller catalyst and a portion of the larger and/or more dense catalyst introduced to the reactor. The effluent may then be transported via flow line 45 to a solids separator 47.

Separator 47 may be a separator configured to separate the two types of catalyst based on their physical properties, namely particle size and/or density. For example, separator 47 may use differences in inertial forces or centrifugal forces to separate FCC catalyst from the ZSM-5. The solids separation vessel 47 is an external vessel to the second reactor 32 and is operated at hydrodynamic properties that enhance the separation of the two types of catalyst based on their physical properties.

After separation in separator 47, the smaller and/or lighter catalyst (Y-type zeolite/FCC catalyst) is then transported from separator 47 to the common disengager or containment vessel 8, housing the riser reactor cyclones and/or reaction termination system, via outlet line 36a. The larger and/or denser catalyst (ZSM-5/ZSM-11) may be returned via flow line 49 to the mixed flow reactor 32 for continued reaction with hydrocarbon feeds introduced through distributors 34.

Entrainment of essentially all of the lighter/smaller catalyst and a portion of the larger and/or more dense catalyst, subsequent separations, and recycle of the larger and/or denser catalyst to reactor 32 may allow for a significant accumulation of the larger and/or denser catalyst in reactor 32. As this catalyst is more selective for the cracking of $C_4$ and naphtha range hydrocarbons, the accumulation of the larger and/or denser catalyst may provide a selectivity and yield advantage. Further, operation of the reactor in a fluidization flow regime to entrain both types of catalyst may provide for improved operability of the reactor or flexibility in operations, as discussed above.

A hydrocarbon feed such as heavy vacuum gas oil or heavy residue feed, light cycle oil (LCO), or steam may be injected as a quench media in the outlet line 36a through a distributor 36b. The flow rate of such quench media may be controlled by setting the temperature of the stream entering the containment vessel 8. All the vapors from second reactor 32, including those fed through distributor 36b, are discharged into the dilute phase of containment vessel 8 through a single stage cyclone 36c. Employing a hydrocarbon feed as a quench media is preferred as it serves dual purpose of cooling the products from second reactor 32 and also enhances the production of middle distillates.

The first stage reactor 3, such as a riser reactor, may operates in the fast fluidization regime (e.g., at a gas superficial velocity in the range from about 3 to about 10 m/s at the bottom section) and pneumatic transport regime (e.g., at a gas superficial velocity in the range from about 10 to about 20 m/s) in the top section.

WHSV in second reactor 32 is typically in the range from about 0.5 $h^{-1}$ to about 50 $h^{-1}$; vapor and catalyst residence times may vary from about 2 to about 20 seconds. When different feeds are introduced, preferably the $C_4$ feed is injected at an elevation below naphtha feed injection. However, interchanging of feed injection locations is possible.

As necessary, make-up catalyst may be introduced via one or more flow lines 42, 43. For example, fresh or make-up FCC or Y-type zeolite catalyst or a mixture of these two may be introduced to regenerator 17 via flow line 42 and fresh or make-up ZSM-5/ZSM-11 catalyst may be introduced to second reactor 32 via flow line 43. Overall system catalyst inventory may be maintained by withdrawing mixed catalyst from regenerator 24, for example. Catalyst inventory and accumulation of the preferred catalyst within reactor 32 may be controlled, as will be described below, via control of the reactor and separator 47 operations.

In some embodiments, a first part of the regenerated catalyst is withdrawn from regenerator 17 into a Regenerated Catalyst (RCSP) hopper 26 via withdrawal line 25, which is in flow communication with regenerator 17 and regenerated catalyst standpipe 27. The catalyst bed in the RCSP hopper 26 floats with regenerator 17 bed level. The regenerated catalyst is then transferred from RCSP hopper 26 to reactor 3 via regenerated catalyst standpipe 27, which is in flow communication with J bend 1. The catalyst flow from regenerator 17 to reactor 3 may be regulated by a RCSP slide valve 28 located on regenerated catalyst standpipe 27. A pressure equalization line 29 may also be provided.

A separator bypass line 60 may also be used to facilitate the transfer of particles from the top of reactor 32 to the vessel 8, such as illustrated in FIG. 1. As described with respect to FIG. 1 above, second reactor 32 utilizes two different catalysts that may differ in one or both of particle size and density, such as a lighter and/or smaller Y-type zeolite or FCC catalyst and a larger and/or denser ZSM-5/ZSM-11 shape-selective pentacil small pore zeolite. The superficial gas velocity in second reactor 32 may be maintained such that essentially all of the lighter, smaller catalyst (e.g., Y-type zeolite/FCC catalyst) and a portion of larger and/or more dense catalyst (e.g., ZSM-5/ZSM-11) is carried out of the reactor with the cracked hydrocarbons and steam recovered via flow line 45.

The effluent from reactor 32 recovered via flow line 45 may thus include cracked hydrocarbon products, unreacted hydrocarbon feedstock, steam (stripping media), and a catalyst mixture, including essentially all of the lighter, smaller catalyst and a portion of the larger and/or more dense catalyst introduced to the reactor. The effluent may then be transported via flow line 45 to a solids separator 47. Separator 47 may be a separator configured to separate the two types of catalyst based on their physical properties, namely particle size and/or density. The separator 47 is operated at hydrodynamic properties that enhance the separation of the two types of catalyst based on their physical properties.

After separation in separator 47, the smaller/lighter catalyst (Y-type zeolite/FCC catalyst) is then transported from separator 47 to the common disengager or containment vessel 8, housing the riser reactor cyclones and/or reaction termination system, via outlet line 36a. The larger and/or denser catalyst (ZSM-5/ZSM-11) may be returned to the mixed flow reactor 32 for continued reaction with hydrocarbon feeds introduced through distributors 34.

Continuously or intermittently, a portion of the effluent containing both types of catalysts being transported via flow line 45 may be diverted to bypass separator 47. The diverted portion of the effluent may flow around separator 47 via flow line 60, which may include a diverter or flow control valve 62. The effluent may then continue via flow line 64 back to disengager 8 for separation of the hydrocarbon products from the catalysts. Flow line 64 may be combined with the effluent and smaller catalyst recovered from separator 47 via flow line 36a, and may be introduced either upstream or downstream of quench 36b. Alternatively, the diverted effluent in line 60 may be fed directly to disengager/containment vessel 8.

While illustrated in FIG. 1 with a diverter valve 62, embodiments herein contemplate use of y-shaped flow conduit or similar apparatus to continuously send a portion of the effluent, containing both catalyst particle types, to disengager 8, while continuously sending a portion of the effluent to separator 47, thus allowing for the desired accumulation of the larger and/or denser catalyst particles within reactor 32. As depicted in FIG. 1, the catalyst from second reactor can also be transferred via line 37, slide valve 38 and transfer line 40 to the regenerator 17. The blower air is used as carrier gas 39 to transfer the catalyst to regenerator 17. Such catalyst transfer facility will not only help in controlling the catalyst bed level in reactor 32 but also help in more frequent catalyst regeneration.

The use of increased flow of carrier fluid and/or the use of a flow diverter, as described above, may beneficially provide for the accumulation of the catalyst selective for cracking naphtha range hydrocarbons in the second reactor, reactor 32. In some embodiments, it has been found that reactor 32 may be operated in a manner to provide regenerated catalyst and maintain sufficient activity within the catalyst bed of reactor 32 such that the catalyst transfer line (flow lines 37, 40) and the associated equipment may be omitted from the flow scheme (as shown in FIG. 6) without detriment to the selectivity and throughput of the reactor and with the added benefits of reduced mechanical complexity and reduced capital and operating costs.

Figure 6:
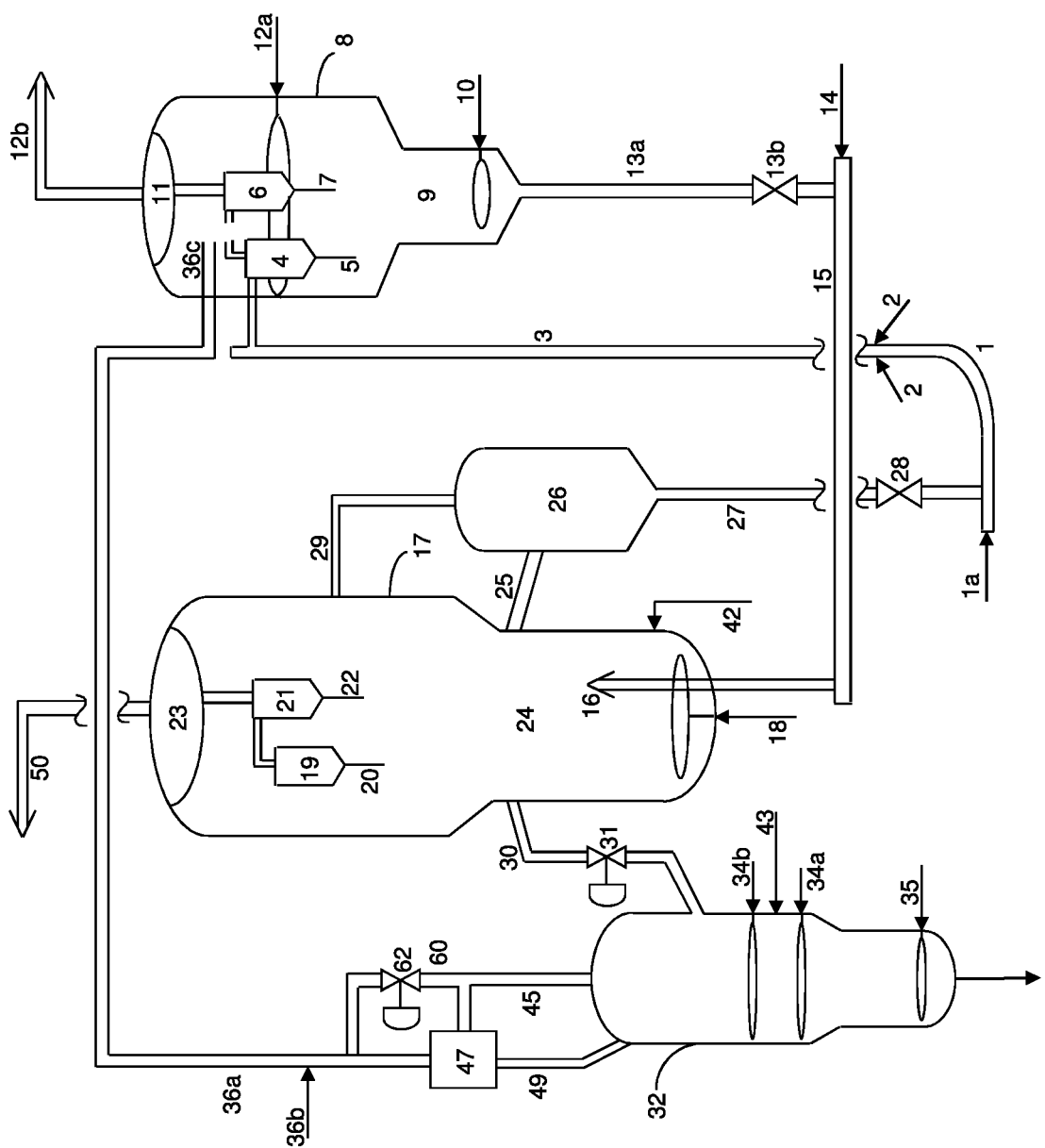
FIG. 6 is a simplified process flow diagram of a system for cracking hydrocarbons and producing light olefins according to one or more embodiments disclosed herein.

Referring now to FIG. 6, a simplified process flow diagram of systems for cracking hydrocarbons and producing light olefins according to embodiments disclosed herein is illustrated, where like numerals represent like parts. Similar to the process scheme illustrated in FIG. 1, described above, the system as illustrated in FIG. 6 will have a two reactor scheme and introduce two kinds of particles (such as a lighter and/or smaller Y-type or FCC catalyst and a larger and/or denser ZSM-5 or ZSM-11 catalyst) in the secondary reactor 32. The larger and/or denser catalyst additives (e.g., ZSM-5 or ZSM-11) may be added directly to the secondary reactor vessel 32 via flow line 43. The regenerated catalyst mixture transfers from regenerator 17 through pipe 30 to the reactor vessel 32.

The catalyst bed in the secondary reactor vessel 32 is expected to operate in turbulent bed, bubbling bed or fast fluidization regimes. A light naphtha feed 34a, such as the light naphtha product from a primary reactor or riser reactor 3, as illustrated, may be fed into the secondary reactor 32 and converted to light olefins in the presence of the mixed catalyst. The lifting gas along with product gas in the vessel 32 will lift the solids, including both catalysts, through the pipe 45 to the solids separation vessel 47, then back to the regenerator 17. Due to the differences in size and/or density of the two catalyst particles, most of the ZSM-5 or ZSM-11 catalyst particles will be separated from the Y-type or FCC catalyst in the solids separation vessel 47 and transferred via return line 49 back to the reactor 32. Most of Y-type or FCC catalyst particles will be transferred back to the stripper 8 for gas solid separation.

As compared to other embodiments discussed above, a primary difference is the absence of a catalyst return line and related control valves and equipment from the bottom of the secondary reactor vessel 32 back to the regenerator vessel 17. As discussed briefly above, such a process configuration may still provide for efficient catalyst regeneration, as well as accumulation and concentration of the desired larger and/or denser ZSM-5 or ZSM-11 catalyst within reactor 32. It is expected that a higher concentration of the larger and/or denser catalyst may result in a better performance in the secondary reactor vessel 32, even when the return line 37 is removed. This design, with the removal of return line 37, also mitigates the mechanical complexity and reduces the capital and operational costs.

The embodiment without a return line 37 (FIG. 6) also includes steam as a lifting gas. As there is no catalyst outlet at the bottom of the reactor 32, the catalyst will fill up the reactor 32 and in some embodiments no catalyst bed level is observed. The lifting gas along with product gas in the vessel 32 will lift the solids, including both catalysts, through the pipe 45 to the solids separation vessel 47. Due to the differences in size and/or density of the two catalyst particles, most of the ZSM-5 or ZSM-11 catalyst particles will be separated from the Y-type or FCC catalyst in the solids separation vessel 47 and transferred via return line 49 back to the reactor 32. Most of Y-type or FCC catalyst particles will be transferred back to the stripper 8 for gas solid separation. As compared to FIG. 1, this design without return line 37 may lead to a much higher concentration of the larger and/or denser catalyst, which will result in a better reaction performance in the reactor 32. Although not illustrated, vessel 32 may include a bottom flange or outlet allowing the vessel to be de-inventoried of catalyst. Such an outlet may also be used to periodically remove larger and/or heavier catalyst particles that may accumulate within vessel 32, if necessary.

As described above, systems according to embodiments herein may include a separator 47 configured to separate the two types of catalysts based on their physical properties, such as particle size and/or density. Separator 47 may be a cyclone separator, a screen separator, mechanical sifters, a gravity chamber, a centrifugal separator, a baffle chamber, a louver separator, an in-line or pneumatic classifier, or other types of separators useful for efficiently separating particles based on size and/or hydrodynamic properties.

Figure 2:
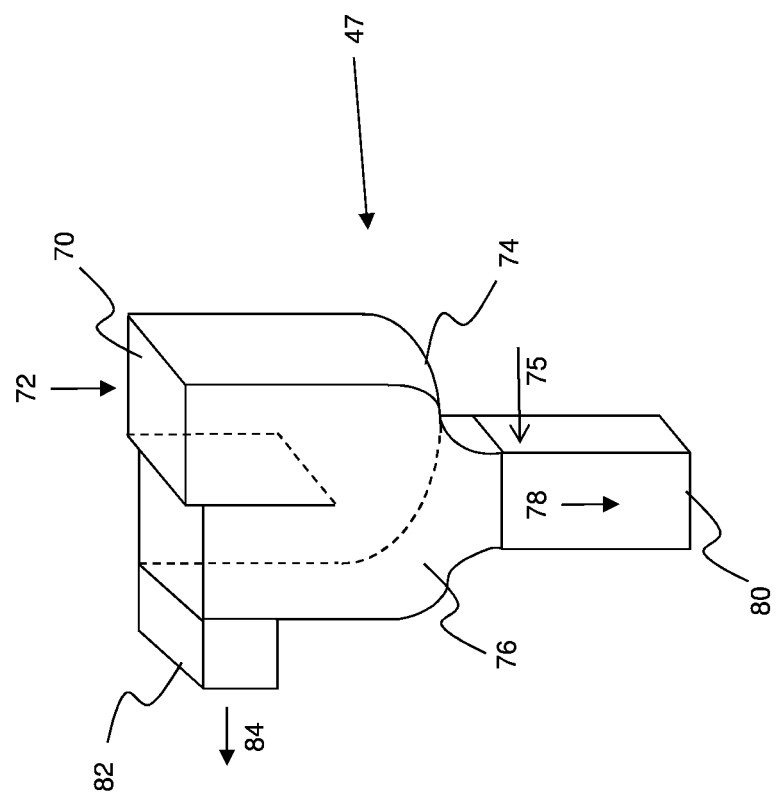
FIGS. 2-5 are simplified process flow diagrams of separators useful in systems according to one or more embodiments disclosed herein.

Examples of separators or classifiers useful in embodiments herein are illustrated in FIGS. 2-5. In some embodiments, separator 47 may be a U-shaped inertial separator, as illustrated in FIG. 2, to separate two kinds of solid particles or catalysts with different particle sizes and/or particle density. The separator may be built in the form of U-shape, having an inlet 70 at the top, a gas outlet 84 at the other end of the U, and a main solid outlet 80 at the base of U-shaped separator.

A mixture 72 of solid particles or catalysts with different sizes is introduced along with a carrier gas stream through inlet 70 and inertial separation forces are applied on the solids by making no more than one turn to separate the different sizes of solid particles. Larger and/or more dense solid particles 78 preferentially go downward in sections 74/76 to a standpipe or dipleg 80 connected to the base of U-shape while lighter or smaller solid particles are preferentially carried along with the gas stream to outlet 82, where the mixture 84 of small particles and gases may be recovered. The solid outlet 80 at the base of U-shaped separator (the inlet of the standpipe or dipleg used to flow the larger and/or more dense catalyst particles back to the second reactor 32) should be large enough to accommodate the normal solid/catalyst flow.

By controlling the gas flow rates entering the downward standpipe and exiting the main gas stream outlet, the overall separation efficiency of the U-shape inertial separator and the selectivity to separate larger and/or more dense particles from smaller and/or less dense particles can be manipulated. This extends to a fully sealed dipleg where the only gas stream exiting the dipleg are those entrained by the exiting solid/catalyst flow. As the U-shaped inertial separator provides the ability to manipulate the separation efficiency, intermediate sized particles, which have the potential to accumulate in the system as noted above, may be periodically or continuously entrained with the hydrocarbon products recovered from separator 47 for separation in vessel 8 and regeneration in regenerator 24.

In some embodiments, a gas sparger 75 or extra steam/inert gas may be provided proximate a top of outlet section 80, such as near a top of the standpipe inlet. The additional lift gas provided within the separator may further facilitate the separation of larger and/or more dense solid particles from less dense and/or smaller solid particles, as the extra gas may preferentially lift lighter solid particles to gas outlet 84, resulting in better solid classification.

The cross sectional area of the U-shaped separator at the inlet 70, outlet 82 and throughout the U-shaped separator (including areas 74, 76) may be adjusted to manipulate the superficial gas velocity within the apparatus to control the separation efficiency and the selectivity. In some embodiments, a position of one or more of the separator walls may be adjustable, or a movable baffle may be disposed within one or more sections of the separator, which may be used to control the separation efficiency and selectivity. In some embodiments, the system may include a particle size analyzer downstream of outlet 82, enabling real-time adjustment of the flow configuration through the U-shaped separator to effect the desired separations.

Utilization of U-shaped inertial separators connected in series or a combination of U-shape inertial separators and cyclones may provide flexibility to allow simultaneously achievement of both target overall separation efficiency and target selectivity of larger and/or more dense particles over smaller and/or less dense particles.

The secondary reactor 32 may also be equipped with baffles or structured internals such as modular grids as described in U.S. Pat. No. 7,179,427. Other types of internals that enhance contact efficiency and product selectivity/yields may also be used. The internals may enhance the catalyst distribution across the reactor and improve the contact of feed vapors with catalyst, leading to an increase in the average reaction rate, enhance the overall activity of the catalyst and optimize the operating conditions to increase the production of light olefins.

Embodiments disclosed herein use Y-type zeolite or conventional FCC catalyst, maximizing the conversion of heavy hydrocarbon feeds. The Y-type zeolite or FCC catalyst is of a smaller and/or lighter particle size than the ZSM-5 or similar catalysts used to enhance the production of light olefins in the countercurrent flow reactor. The ZSM-5 or similar catalysts have a larger particle size and/or are more dense than the Y-type zeolite or FCC catalysts used to enhance separations of the catalyst types in each of the mixed flow reactor and the solids separator. The superficial gas velocity of vapors in the second reactor is maintained such that it allows entrainment of the Y-type zeolite or FCC catalyst and a portion of the ZSM-5 or ZSM-11 catalyst out of the mixed flow reactor, and the solids separator may utilize the differences in single particle terminal velocities or differences between minimum fluidization/minimum bubbling velocities to separate and return the ZSM-5/ZSM-11 to the mixed flow reactor. This concept allows the elimination of two stage FCC systems and hence a simplified and efficient process. The catalysts employed in the process could be either a combination of Y-type zeolite/FCC catalyst and ZSM-5 or other similar catalysts, such as those mentioned in U.S. Pat. Nos. 5,043,522 and 5,846,402.

The entrainment of both catalysts from the mixed flow reactor, subsequent separation, and recycle and accumulation of the ZSM-5/ZSM-11 catalyst in the mixed flow reactor eliminates any potential restriction on superficial gas velocity in the secondary reactor. The use of a solids separation vessel thus provides process flexibility in the secondary reactor, allowing the secondary reactor to be operated in bubbling bed, turbulent bed, or fast fluidization regimes, rather than restricting the operations to only a bubbling bed regime. The solids separation vessel may be a cyclone or other vessel where solids and gases are introduced at a common inlet, and through degassing, inertial and centrifugal forces, the particles are separated based on size and/or density, with the majority of the smaller FCC type particles entraining with the vapor outlet, and the larger and/or denser ZSM-5 or ZSM-11 type particles returning via a dense phase standpipe or dipleg back to the secondary reactor vessel 32.

Figure 3:
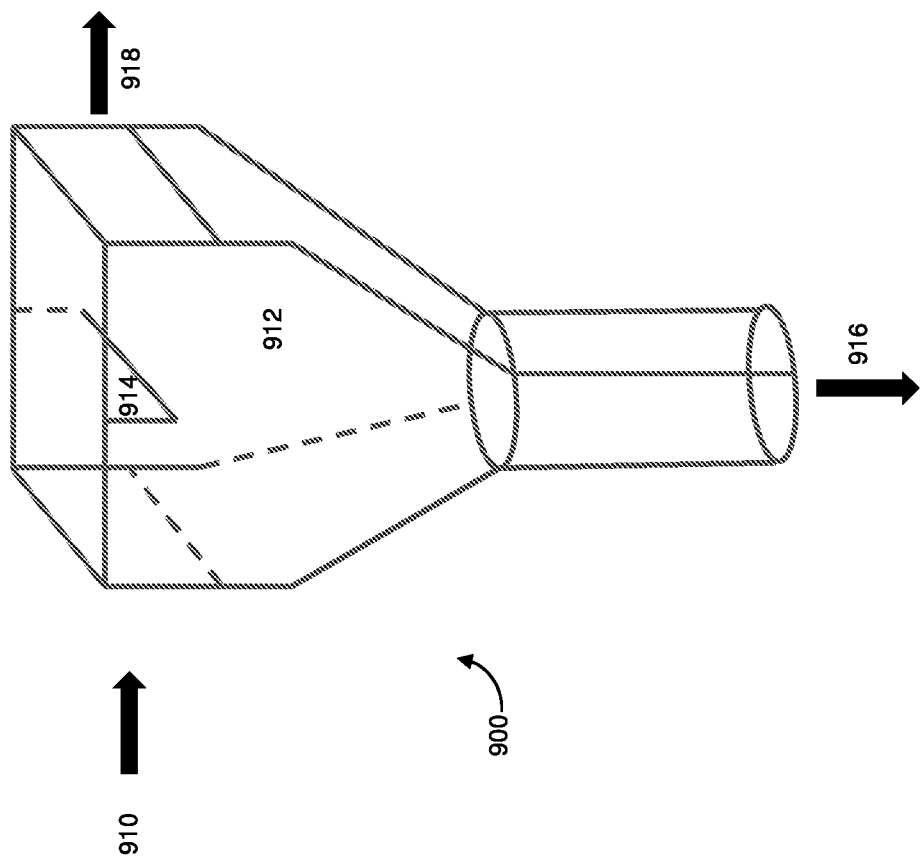

In addition to the U-type particle separator described in relation to FIG. 2, FIGS. 3-5 illustrate various additional particle separation devices for use in embodiments herein. Referring to FIG. 3, a baffle chamber separator 900 for separating catalysts or other particles based on size and/or density may include an inlet 910, such as a horizontal conduit. The vapors and particles contained in the horizontal conduit then enter a chamber 912, before being deflected by a baffle 914. The chamber 912 is connected to a first vertical outlet 916 and a first horizontal outlet 918. The baffle 914 may be located in the middle of chamber 912, proximate the inlet 910, or proximate the horizontal outlet 918 of the chamber. The baffle may be at an angle or moveable such that the baffle may be used to deflect more or less catalyst particles, and may be configured for a particular mixture of particles.

Processes herein may utilize the baffle chamber separator 900 to segregate larger and/or denser particles from smaller and/or less dense particles contained in a carrier gas, such as a hydrocarbon reaction effluent. The baffle chamber separator 900 may be configured to: separate at least a portion of a second particle type from the carrier gas and a first particle type, recover the second particle type via the first vertical outlet 916 and recover a mixture including the carrier gas and the first particle type via the first horizontal outlet 918. The separator may also include a distributor (not illustrated) disposed within or proximate the first vertical outlet for introducing a fluidizing gas, facilitating additional separation of the first particle type from the second particle type.

Figure 4:
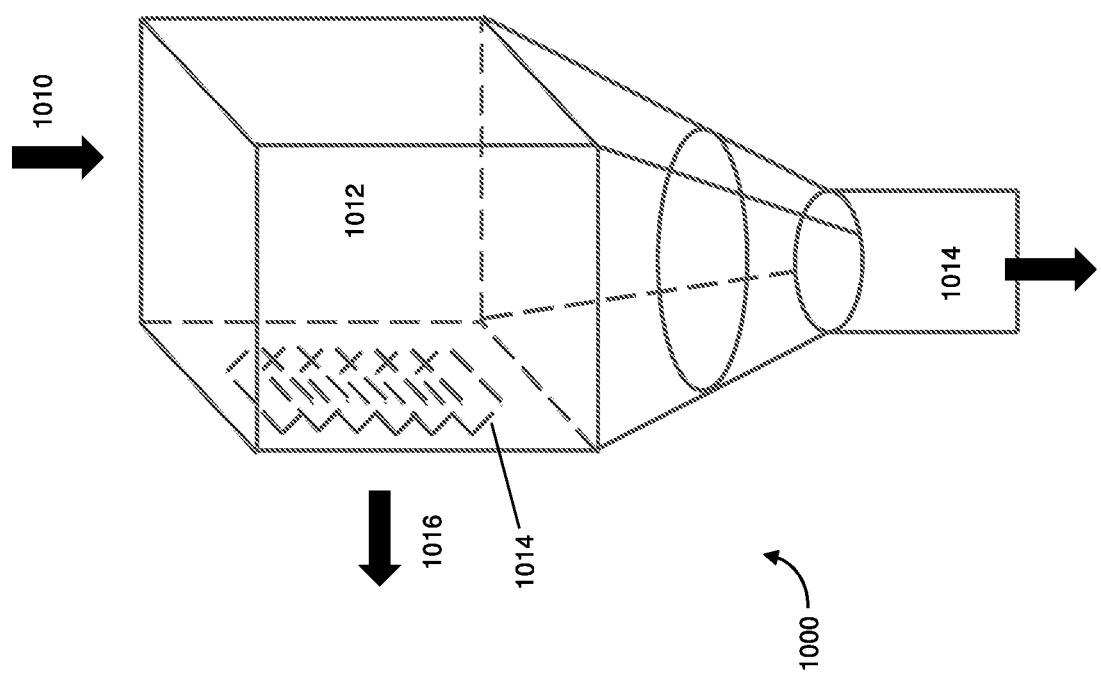

Referring now to FIG. 4, a louver separator for use in accordance with embodiments herein is illustrated. Similar to other separators illustrated and described, the louver separator 1000 may be used for separating catalysts or other particles based on size and/or density. The louver separator 1000 may include a vertical inlet 1010 connected to a chamber 1012 where one or more vertical sides 1014 of the chamber are equipped with narrow slot outlets 1016, which may be described as louvers. The number of louvers may vary depending on the application, such as the desired particle mixture to be separated, and the angle of the louver may be adjustable in order to control the amount of vapor passing through and leaving the louver outlets. The chamber 1012 is also connected to a first vertical outlet 1014 at the bottom of the chamber.

Processes herein may utilize the louver separator 1000 to segregate larger and/or denser particles from smaller and/or less dense particles contained in a carrier gas, such as a hydrocarbon reaction effluent. The louver separator 1000 may be configured to: separate at least a portion of the second particle type from the carrier gas and the first particle type, recover the second particle type via the first vertical outlet 1014 and recover the carrier gas and the first particle type via the louver outlets 1016. The separator may also include a distributor (not illustrated) disposed within or proximate the first vertical outlet for introducing a fluidizing gas, facilitating additional separation of the first particle type from the second particle type.

Figure 5:
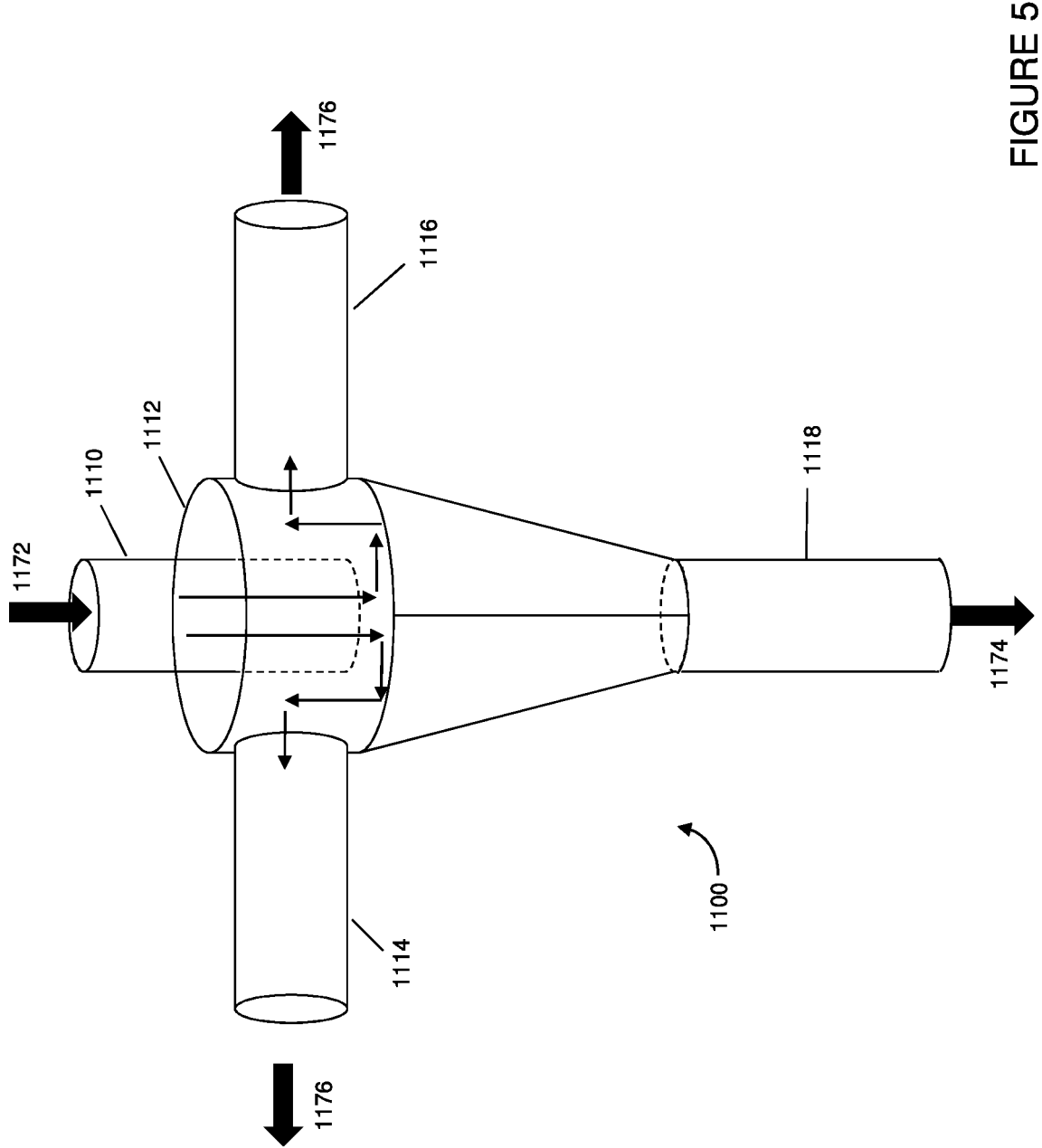

Referring now to FIG. 5, an inertial separator 1100 for use in accordance with embodiments herein is illustrated. Similar to other separators illustrated and described, the inertial separator 1100 may be used for separating catalysts or other particles based on size and/or density. The separator may include an inlet 1110 at the top of and extending into a chamber 1112. In some embodiments, the height or disposition of inlet 1110 within chamber 1112 may be adjustable. The separator may also include one or more side outlets 1114, 1116, such as one to eight side outlets, and a vertical outlet 1118. The separator may also include a distributor (not illustrated) disposed within or proximate the vertical outlet 1118 for introducing a fluidizing gas.

A mixture 1172 of solid particles or catalysts with different sizes is introduced along with a carrier gas stream through inlet 1110. The gases in the mixture 1172 are preferentially directed toward outlets 1114, 1116 based on pressure differentials, and inertial separation forces are applied on the solids by making the particles and carrier gas turn from the extended inlet 1110 within chamber 1112 to flow toward outlets 1114, 1116, the inertial forces separating the different sizes/densities of particles. Larger and/or heavier solid particles 1174 preferentially go downward in sections 1118 to a standpipe or dipleg (not shown) connected to the base of the separator, while lighter or smaller solid particles 1176 are preferentially carried along with the gas stream to outlets 1114, 1116, where the mixture of small particles and gases may be recovered.

In each of the separators described herein, by controlling the gas flow rates entering the downward standpipe/separation chamber and exiting the main gas stream outlet, the overall separation efficiency of the separator and the selectivity to separate heavier and/or larger particles from lighter or smaller particles can be manipulated. This extends to a fully sealed dipleg where the only gas stream exiting the dipleg are those entrained by the exiting solid/catalyst flow.

In some embodiments, a gas sparger or extra steam/inert gas may be provided proximate a top of the heavy/dense particle outlet section, such as near a top of the standpipe inlet. The additional lift gas provided within the separator may further facilitate the separation of heavier and/or larger solid particles from lighter or smaller solid particles, as the extra gas may preferentially lift lighter solid particles to the gas outlets, resulting in better solid classification.

The particle separators described herein may be disposed external or internal to a vessel. Further, in some embodiments, the large/dense particle outlets of the particle separators may be fluidly connected to an external vessel, providing for selective recycle or feed of the separated particles to the desired reactor, so as to maintain a desired catalyst balance, for example.

Embodiments disclosed herein, by the methods described above, significantly increase the concentration of desired catalysts in the secondary reactor (vessel 32), consequently increasing light olefin yield. In addition, this process also serves as a method to decouple the withdrawal and addition of the ZSM-5 and ZSM5-11 with the withdrawal and addition of FCC catalyst. In summary, the FCC process presented in this disclosure creates a desired ZSM-5 or ZSM-11 catalyst additive rich environment in the secondary reactor 32, which could preferentially convert light naphtha products, such as those derived from primary reactor, to improve light olefin yield while simultaneously maximizing middle distillate yield by applying optimum operation condition in the primary reactor or riser.

Another benefit of embodiments disclosed herein is that the integrated two-reactor scheme overcomes the heat balance limitations in the stand alone $C_4$/naphtha catalytic cracking processes. The secondary (mixed flow) reactor acts as a heat sink due to integration with the catalyst regenerator, minimizing the requirement of catalyst cooler while processing residue feed stocks.

The product vapors from the secondary reactor are transported into the first stage reactor/disengaging vessel or reaction termination device wherein these vapors are mixed and quenched with the products from the first stage and or external quench media such as LCO or steam to minimize the unwanted thermal cracking reactions. Alternatively, the product outlet line of the secondary reactor/solids separator can also be used to introduce additional quantity of heavy feed or re-route part of the feed from the first stage reactor (the riser reactor). This serves two purposes: (1) the catalyst in the solids separator vapor outlet line is predominantly Y-type zeolite/conventional FCC catalyst that is preferred to crack these heavy feed molecules into middle distillates, and (2) such cracking reaction is endothermic that helps in reducing the temperature of the outgoing product vapors and also residence time.

In some embodiments disclosed herein, an existing FCC unit may be retrofitted with a secondary reactor as described above. For example, a properly sized reactor may be fluidly connected to an existing catalyst regeneration vessel to provide catalyst feed and return from the mixed flow vessel, and fluidly connected to an existing disengagement vessel to separate the hydrocarbon products and catalysts. In other embodiments, a mixed flow reactor may be added to a grass-roots FCC unit that is aimed at operating in gasoline mode, light olefins mode, or diesel mode.

The reactor system described above with respect to FIGS. 1 and 6 related primarily to light olefins production, and advantageous concentration of a catalyst in a mixed catalyst system to enhance reactivity and selectivity of the system. Such a reactor system may also be used for other mixed catalyst systems, where concentration of one of the catalysts may be advantageous.

For example, in some embodiments, the reaction system may be used for gasoline desulfurization, where catalyst mixture may include a smaller and/or less dense FCC catalyst, such as zeolite Y, and a larger and/or denser catalyst, such as a gasoline desulfurization additive. Such a process is described with respect to FIG. 7.

Figure 7:
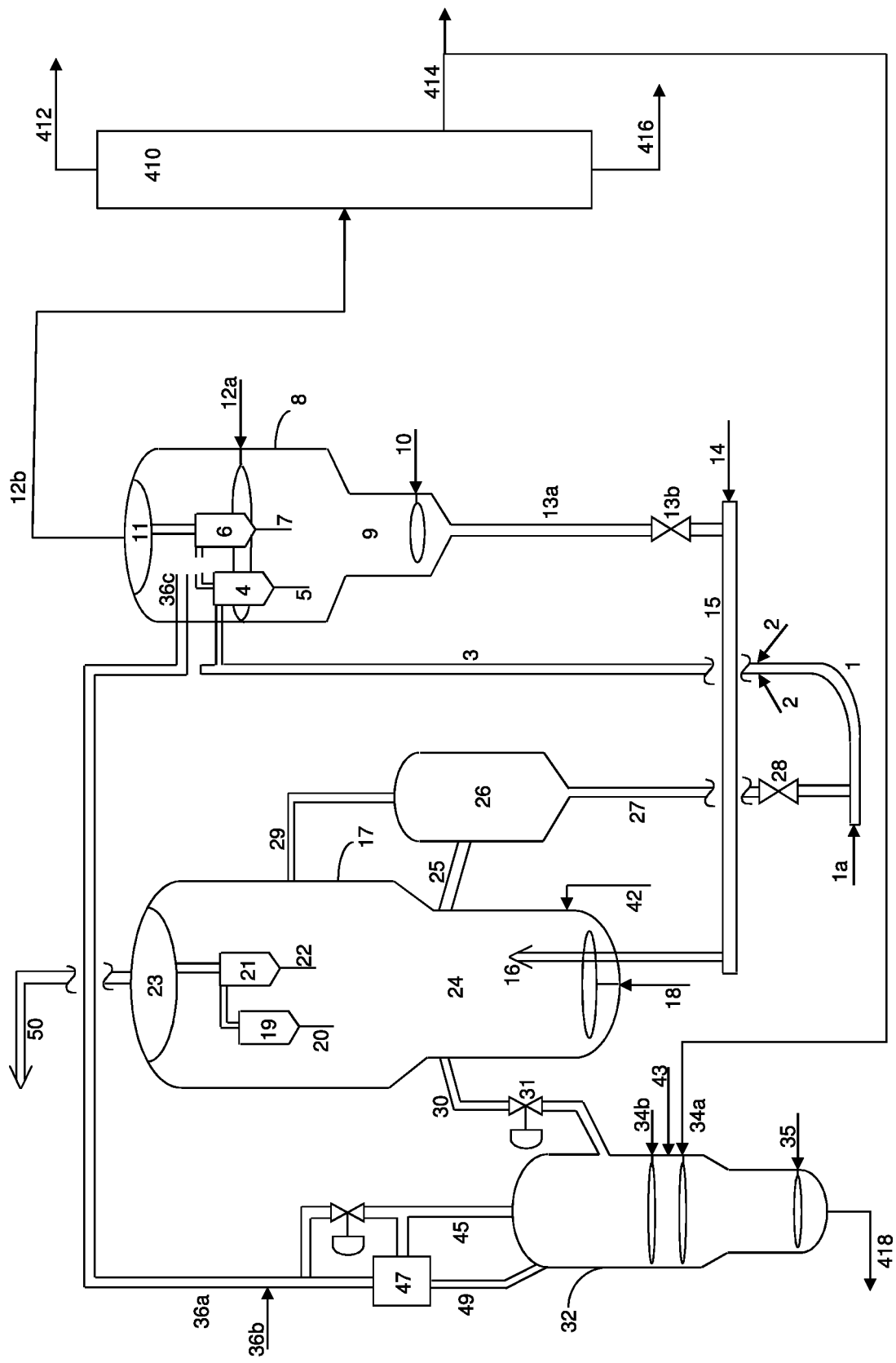
FIG. 7 is a simplified process flow diagram of a system for cracking hydrocarbons and producing light olefins according to one or more embodiments disclosed herein.

Referring now to FIG. 7, a simplified process flow diagram of systems for cracking and desulfurizing hydrocarbons according to embodiments disclosed herein is illustrated. The system includes a two-reactor configuration for producing olefins, such as propylene and ethylene, from petroleum feedstocks or other hydrocarbon streams. The first reactor 3 may be a riser reactor for cracking heavier hydrocarbon feeds, for example. The second reactor 32 is a fluidized bed reactor, which may be equipped with baffles or internals. The cracked hydrocarbon products, including olefins and/or light naphtha products from the first reactor 3 or similar feed streams from external sources, may be processed in the second reactor 32 to enhance the quality of the product, such as decreasing the overall sulfur content of the hydrocarbons processed in the second reactor.

A heavy petroleum residue feed is injected through one or more feed injectors 2 located near the bottom of first reactor 3. The heavy petroleum feed contacts hot regenerated catalyst introduced through a J-bend 1. The catalyst fed to the first reactor 3 is a catalyst mixture, including a first catalyst selective for cracking heavier hydrocarbons, such as a Y-type zeolite based catalyst, and a second catalyst selective for the desulfurization of naphtha range hydrocarbons, which may also be used in combination with other catalysts. The first and second catalysts may be different in one or both particle size and density.

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 17.

After the major part of the cracking reaction is completed, the mixture of products, unconverted feed vapors, and spent catalyst flow into a two stage cyclone system housed in cyclone containment vessel 8. The two-stage cyclone system includes a primary cyclone 4, for separating spent catalyst from vapors. The spent catalyst is discharged into stripper 9 through primary cyclone dip leg 5. Fine catalyst particles entrained with the separated vapors from primary cyclone 4 and product vapors from second reactor 32, introduced via flow line 36a and a single stage cyclone 36c, are separated in second stage cyclone 6. The catalyst mixture collected is discharged into stripper 9 via dip leg 7. The vapors from second stage cyclone 6 are vented through a secondary cyclone outlet 12b, which may be connected to plenum 11, and are then routed to a fractionator/gas plant 410 for recovery of products, including the desired olefins. If necessary, the product vapors are further cooled by introducing light cycle oil (LCO) or steam via distributor line 12a as a quench media.

The fractionator 410 may be, for example, a main fractionator of an FCC plant, and may produce various hydrocarbon fractions, including a light olefin-containing fraction 412, a naphtha fraction 414, and a heavies fraction 416, among other various hydrocarbon cuts. The products routed to fractionator/gas plant 410 may include other light gases, such as hydrogen sulfide that may be produced during desulfurization; Separators, absorbers, or other unit operations may be included where such impurities are desired to be separated upstream of the main fractionator/gas plant.

The spent catalyst recovered via dip legs 5, 7 undergoes stripping in stripper bed 9 to remove interstitial vapors (the hydrocarbon vapors trapped between catalyst particles) by countercurrent contacting of steam, introduced to the bottom of stripper 9 through a steam distributor 10. The spent catalyst is then transferred to regenerator 17 via the spent catalyst standpipe 13a and lift line 15. Spent catalyst slide valve 13b, located on spent catalyst standpipe 13a, is used for controlling catalyst flow from stripper 9 to regenerator 17. A small portion of combustion air or nitrogen may be introduced through a distributor 14 to help smooth transfer of spent catalyst.

Coked or spent catalyst is discharged through spent catalyst distributor 16 in the center of the dense regenerator bed 24. Combustion air is introduced by an air distributor 18 located at the bottom of regenerator bed 24. Coke deposited on the catalyst is then burned off in regenerator 17 via reaction with the combustion air. The catalyst fines entrained along with flue gas are collected in first stage cyclone 19 and second stage cyclone 21 and are discharged into the regenerator catalyst bed through respective dip legs 20, 22. The flue gas recovered from the outlet of second stage cyclone 21 is directed to flue gas line 50 via regenerator plenum 23 for downstream waste heat recovery and/or power recovery.

A first part of the regenerated catalyst mixture is withdrawn via regenerated catalyst standpipe 27, which is in flow communication with J bend 1. The catalyst flow from regenerator 17 to reactor 3 may be regulated by a slide valve 28 located on regenerated catalyst standpipe 27. The opening of slide valve 28 is adjusted to control the catalyst flow to maintain a desired top temperature in reactor 3.

In addition to lift steam, a provision is also made to inject feed streams such as $C_4$ olefins and naphtha or similar external streams as a lift media to J bend 1 through a gas distributor 1a located at the Y-section for enabling smooth transfer of regenerated catalyst from J bend 1 to reactor 3. J bend 1 may also act as a dense bed reactor for cracking $C_4$ olefins and naphtha streams into light olefins at conditions favorable for such reactions.

A second part of the regenerated catalyst mixture is withdrawn into a second reactor 32 through a standpipe 30. A valve 31 may be used to control the catalyst flow from regenerator 17 to second reactor 32 based on a vapor outlet temperature set point. One or more hydrocarbon fractions, such as naphtha streams, may be injected into the bottom section of the catalyst bed through one or more feed distributors 34 (34a, 34b), either in liquid or vapor phase. In some embodiments, the naphtha feed may include a portion or all of the naphtha 414 from the fractionator 410. Second reactor 32 operates in a mixed flow fashion, where a portion of the regenerated catalyst flows downward (from the top to the bottom of the reactor bed) and/or circulates within vessel 32, and a portion of the regenerated catalyst mixture and the feed hydrocarbon stream flows upward (from the bottom to the top of the reactor bed, the smaller/less dense particles carrying out of the top of the reactor with the effluent hydrocarbons).

Second reactor 32 may be equipped with baffles or structured internals (not shown) that help intimate contact and mixing of catalyst and feed molecules. These internals may also help in minimizing channeling, bubble growth, and/or coalescence. Second reactor 32 may also be enlarged at different sections along the length to maintain a constant or desired superficial gas velocity within the sections.

After the reaction is completed, the catalyst is stripped at the bottommost portion of second reactor 32 to separate entrained hydrocarbon feed/products using steam as a stripping media introduced through distributor 35. The spent catalyst recovered at the bottom of reactor 32 may then be withdrawn through catalyst withdrawal line 418. Alternatively, the spent catalyst recovered at the bottom of reactor 32 may be transferred to regenerator 17, as described above with respect to FIG. 1 (via standpipe 37 and lift line 40 through a spent catalyst distributor 41, where combustion air or nitrogen may be introduced through distributor 39 to enable smooth transfer of catalyst to regenerator 17). A valve (not illustrated) may be used to control the catalyst flow from second reactor 32.

As noted above, second reactor 32 utilizes two different catalysts that may differ in one or both of particle size and/or density, such as a less dense and/or smaller Y-type zeolite or FCC catalyst and a larger and/or denser desulfurization catalyst. The superficial gas velocity in second reactor 32 is maintained such that essentially all or a large portion of the lighter, smaller catalyst and a portion of the larger and/or denser catalyst is carried out of the reactor with the hydrocarbon products and steam recovered via effluent flow line 45. A portion of the larger and/or denser catalyst may be retained within the reactor 32, forming a dense bed toward the lower portion of the reactor, as noted above.

The effluent from reactor 32 recovered via flow line 45 may thus include desulfurized hydrocarbon products, unreacted hydrocarbon feedstock, steam (stripping media), and a catalyst mixture, including essentially all of the lighter and/or smaller catalyst and a portion of the heavier and/or larger catalyst introduced to reactor 32. The effluent may then be transported via flow line 45 to a solids separator 47. Separator 47 may be a separator configured to separate the two types of catalyst based on their physical properties, namely particle size and/or density. For example, separator 47 may use differences in inertial forces or centrifugal forces to separate the smaller and/or lighter catalyst from the larger and/or heavier catalyst. The solids separation vessel 47 is an external vessel to the second reactor 32 and is operated at hydrodynamic properties that enhance the separation of the two types of catalyst based on their physical properties.

After separation in separator 47, the smaller and/or lighter catalyst (Y-type zeolite/FCC catalyst) is then transported from separator 47 to the common disengager or containment vessel 8, housing the riser reactor cyclones and/or reaction termination system, via outlet line 36*a*. The larger and/or heavier desulfurization catalyst may be returned via flow line 49 to the mixed flow reactor 32 for continued reaction with hydrocarbon feeds introduced through distributors 34*a/b*.

Entrainment of essentially all of the lighter/smaller catalyst and a portion of the heavier and/or larger catalyst, subsequent separations, and recycle of the heavier and/or larger catalyst to reactor 32 may allow for a significant accumulation of the larger and/or heavier desulfurization catalyst in reactor 32. As this catalyst is more selective for the desulfurization of naphtha range hydrocarbons, the accumulation of the larger and/or heavier catalyst may provide a selectivity and yield advantage. Further, operation of the reactor in a fluidization flow regime to entrain both types of catalyst may provide for improved operability of the reactor or flexibility in operations, as discussed above.

A hydrocarbon feed such as heavy vacuum gas oil or heavy residue feed, light cycle oil (LCO), or steam may be injected as a quench media in the outlet line 36*a* through a distributor 36*b*. The flow rate of such quench media may be controlled by setting the temperature of the stream entering the containment vessel 8. All the vapors from second reactor 32, including those fed through distributor 36*b*, are discharged into the dilute phase of containment vessel 8 through a single stage cyclone 36*c*. Employing a hydrocarbon feed as a quench media is preferred as it serves dual purpose of cooling the products from second reactor 32 and also enhances the production of middle distillates.

The first stage reactor 3, such as a riser reactor, may operates in the fast fluidization regime (e.g., at a gas superficial velocity in the range from about 3 to about 10 m/s at the bottom section) and pneumatic transport regime (e.g., at a gas superficial velocity in the range from about 10 to about 20 m/s) in the top section.

WHSV in second reactor 32 is typically in the range from about 0.5 $h^{-1}$ to about 50 $h^{-1}$; vapor and catalyst residence times may vary from about 2 to about 20 seconds. As necessary, make-up catalyst may be introduced via one or more flow lines 42, 43. For example, fresh or make-up FCC or Y-type zeolite catalyst or a mixture of these two may be introduced to regenerator 17 via flow line 42 and fresh or make-up gasoline desulfurization additive may be introduced to second reactor 32 via flow line 43. Overall system catalyst inventory may be maintained by withdrawing mixed catalyst from regenerator 24, for example, and/or reactor 32. Catalyst inventory and accumulation of the preferred catalyst within reactor 32 may be controlled, such as described above. Additionally, in some embodiments, a catalyst hopper 26 may be used in conjunction with catalyst withdrawal line 25, pressure equalization line 29, and standpipe 27, as described above.

Similarly, the reactor system of FIG. 7 may be used for advantageous processing of heavy hydrocarbon feedstocks, including heavy crudes or virgin crudes. In such an embodiment, the mixed catalyst system may include, for example, a smaller and/or less dense FCC catalyst, such as zeolite-Y, and a larger and/or denser heavy oil treatment additive. For example, the heavy oil treatment additive may be one of an active matrix catalyst, a metals trapping additive, a coarse and/or dense Ecat (equilibrium catalyst), a matrix or binder type catalyst (such as kaolin or sand) or a high matrix/zeolite ratio FCC catalyst, among others. The heavy oil treatment additive may have minimal catalytic activity towards cracking of heavier hydrocarbons and may simply supply the surface area necessary for thermal cracking reactions to take place. The heavy hydrocarbon feed may be introduced to reactor 32 via distributors 43 *a/b*, and the system may be operated as described above to enhance the processing of heavy hydrocarbon feedstocks.

WHSV in the second reactor 32 when operating under heavy hydrocarbon treatment conditions is typically in the range from 0.1-100 hr-1; vapor and particle residence times may vary from 1-400 seconds. As necessary, makeup particles may be introduced via one or more lines 42, 43; it may be advantageous to add the FCC or Y-type catalyst to the regenerator 17 via line 42 and the heavy oil treatment additive via line 43 to the second reactor 32. Overall system activity is maintained by withdrawing particles via line 418 from the second reactor 32 and from the regenerator 24. Solids inventory and the accumulation of the preferred heavy oil treatment additive in second reactor 32 may be controlled by additions through line 43 and withdrawals through line 418. Operating temperature in second reactor 32 is controlled using catalyst from regenerator 17 line 30 via valve 31 and may range from 400-700° C. In some embodiments, the product of second reactor 32 may be essentially the feed for primary riser reactor 3. Additionally, in some embodiments, a catalyst hopper 26 may be used in conjunction with catalyst withdrawal line 25, pressure equalization line 29, and standpipe 27, as described above In general, the process flow diagrams illustrated in FIGS. 1, 6, and 7 use the catalyst/particle separation technology to process additional or recycle hydrocarbon feedstocks in a secondary vessel. The catalyst mixture circulating through the system may include catalysts selective to particular reactions, such as cracking, desulfurization, demetalization, denitrogenation, and other, where the catalysts of the mixture are selected to have differing physical properties, as described above, such that a desired catalyst may be concentrated in the secondary reactor. Regenerated catalyst is fed to the secondary reactor/vessel which may operate in fast fluidized, bubbling, or turbulent bed operation (depending on application). The effluent of the secondary reactor/vessel goes to the separator 47, where the primary and secondary catalysts are separated based on size and/or density and the separator bottoms, which is enriched in the secondary catalyst, is recycled back to the secondary reactor/vessel. The secondary reactor/vessel has optional catalyst withdrawals which may be advantageous depending on application as well as different hydrocarbon feeds depending on application. The concentration of the secondary catalyst may enhance the operability, flexibility, and selectivity of the overall reaction system.

The separator 47 as described above with respect to FIG. 2 may be used to enhance productivity and flexibility of mixed catalyst hydrocarbon processing systems, where the separator 47 may be located at other advantageous locations within the system. Such processes and systems are described further below with respect to FIGS. 8-11, where like numerals represent like parts.

Figure 8A:
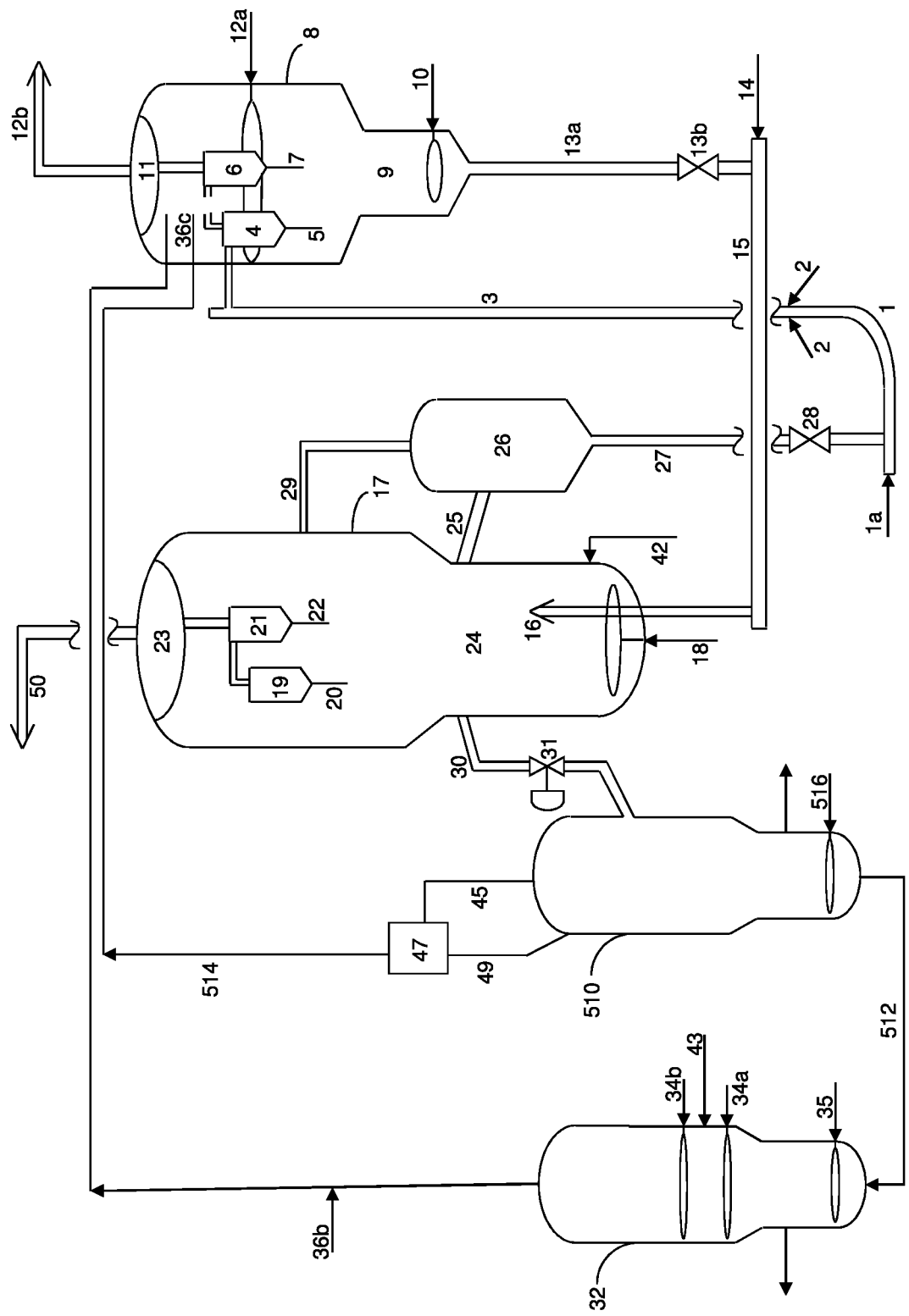
FIG. 8A is a simplified process flow diagram of a system for cracking hydrocarbons and producing light olefins according to one or more embodiments disclosed herein.

Referring now to FIG. 8A, a simplified process flow diagram of systems for converting hydrocarbons and producing olefins according to embodiments disclosed herein is illustrated, where like numerals represent like parts. The process scheme of FIG. 8A adds a catalyst holding vessel 510 which is fed regenerated catalyst from the FCC regenerator via catalyst withdrawal line 30 and valve 31. The holding vessel 510 may be fluidized with a fluidization medium, such as air, nitrogen, or steam, for example, introduced via flow line 516. The holding vessel effluent 45 is sent to the separator 47 where the mixture of catalysts is separated. The separator bottoms 49, which is enriched in the larger and/or heavier catalyst, is recycled back to catalyst holding vessel 510, where the concentration of the larger and/or denser catalyst will build up. The remaining stream 514 from the separator 510 is returned to the disengagement vessel 8 in this embodiment. The bottoms 512 of the holding vessel may be coupled to a slide valve (not illustrated) which can control the feed of catalyst to secondary reactor/vessel 32, which can be operated in a similar fashion to that described above with respect to FIGS. 1, 6, and 7. Advantageously, the catalyst concentrated in vessel 510 will not be saturated with hydrocarbon and may allow for lower contact times with catalyst in the secondary reactor/vessel 32.

Figure 8B:
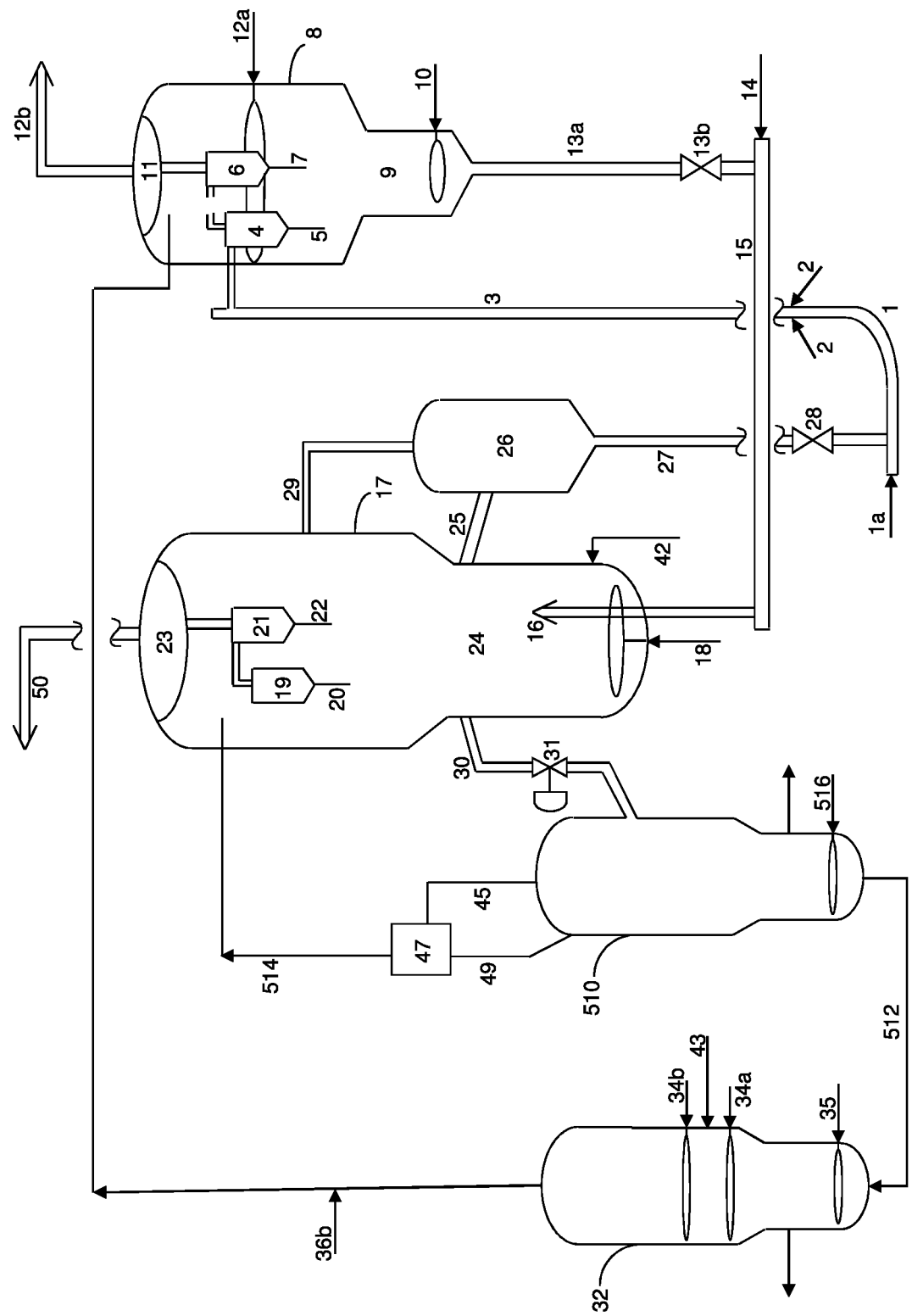
FIG. 8B is a simplified process flow diagram of a system for cracking hydrocarbons and producing light olefins according to one or more embodiments disclosed herein.

FIG. 8B illustrates a system similar to that of FIG. 8A, except the catalyst recovered from separator 47 via flow line 514 is returned to the catalyst regenerator 17 as opposed to being forwarded to the disengagement vessel 8. The vessel to which the catalyst in flow line 514 is forwarded may depend upon the type of fluidization gas introduced via flow line 516 as well as the capabilities of the systems receiving flow from either regenerator 17 or vessel 8, via flow lines 50 and 12b, respectively. Where the fluidization gas is steam, for example, the catalyst in flow line 514 is preferably forwarded to vessel 8; where the fluidization gas is air or nitrogen, for example, the catalyst in flow line 514 is preferably forwarded to regenerator 17.

FIGS. 8A and 8B illustrate the smaller particles recovered via flow line 514 as being forwarded to the regenerator 17 or disengagement vessel 8, and the larger and/or heavier particles recovered via flow line 512 as being forwarded to secondary reactor 32. Embodiments herein also contemplate forwarding of the smaller and/or lighter particles recovered via the separator 47 and flow line 514 to secondary reactor 32 while recirculating the larger and/or heavier particles to the regenerator 17 or stripper 9.

Figure 9A:
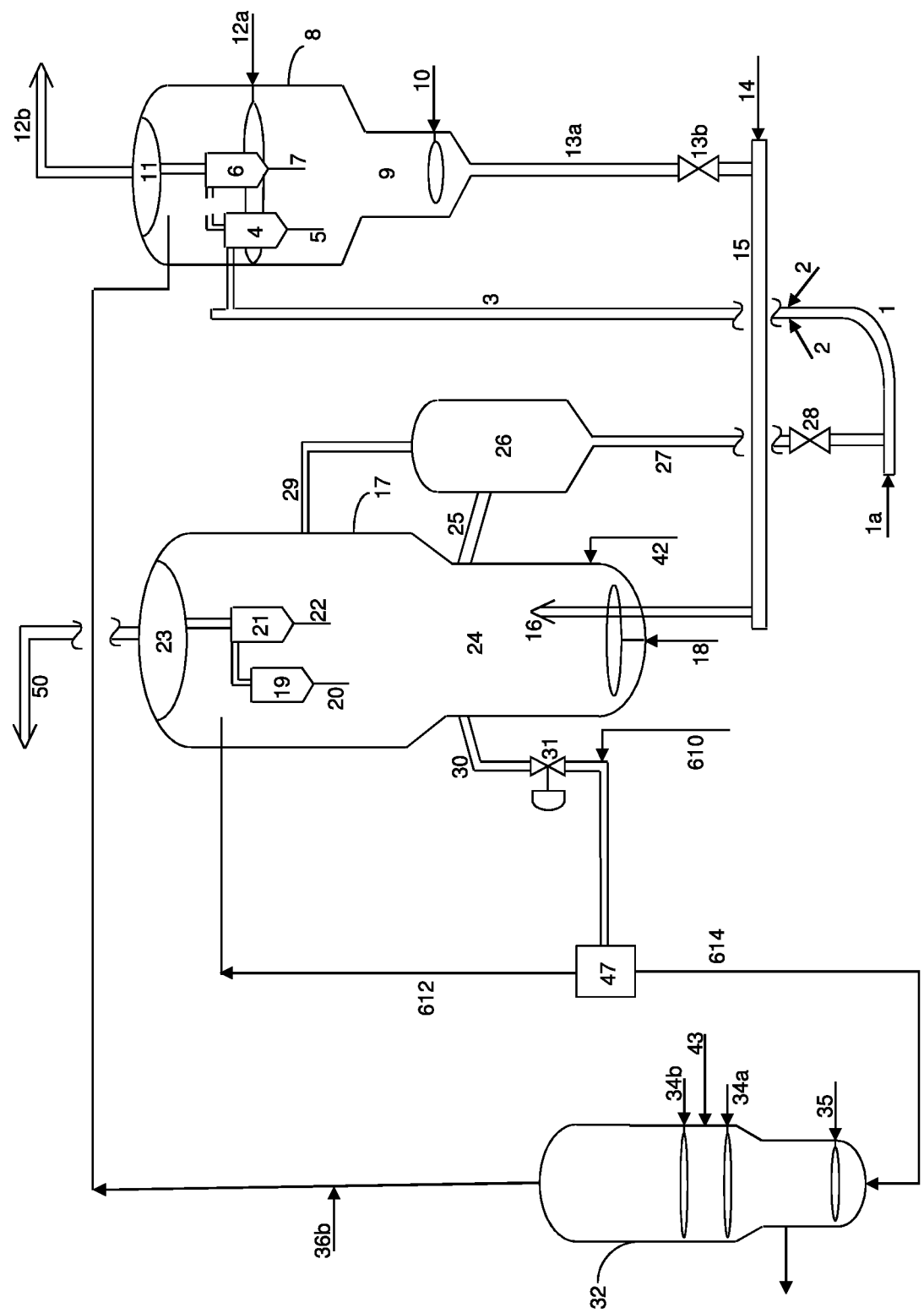
FIG. 9A is a simplified process flow diagram of a system for cracking hydrocarbons and producing light olefins according to one or more embodiments disclosed herein.
Figure 9B:
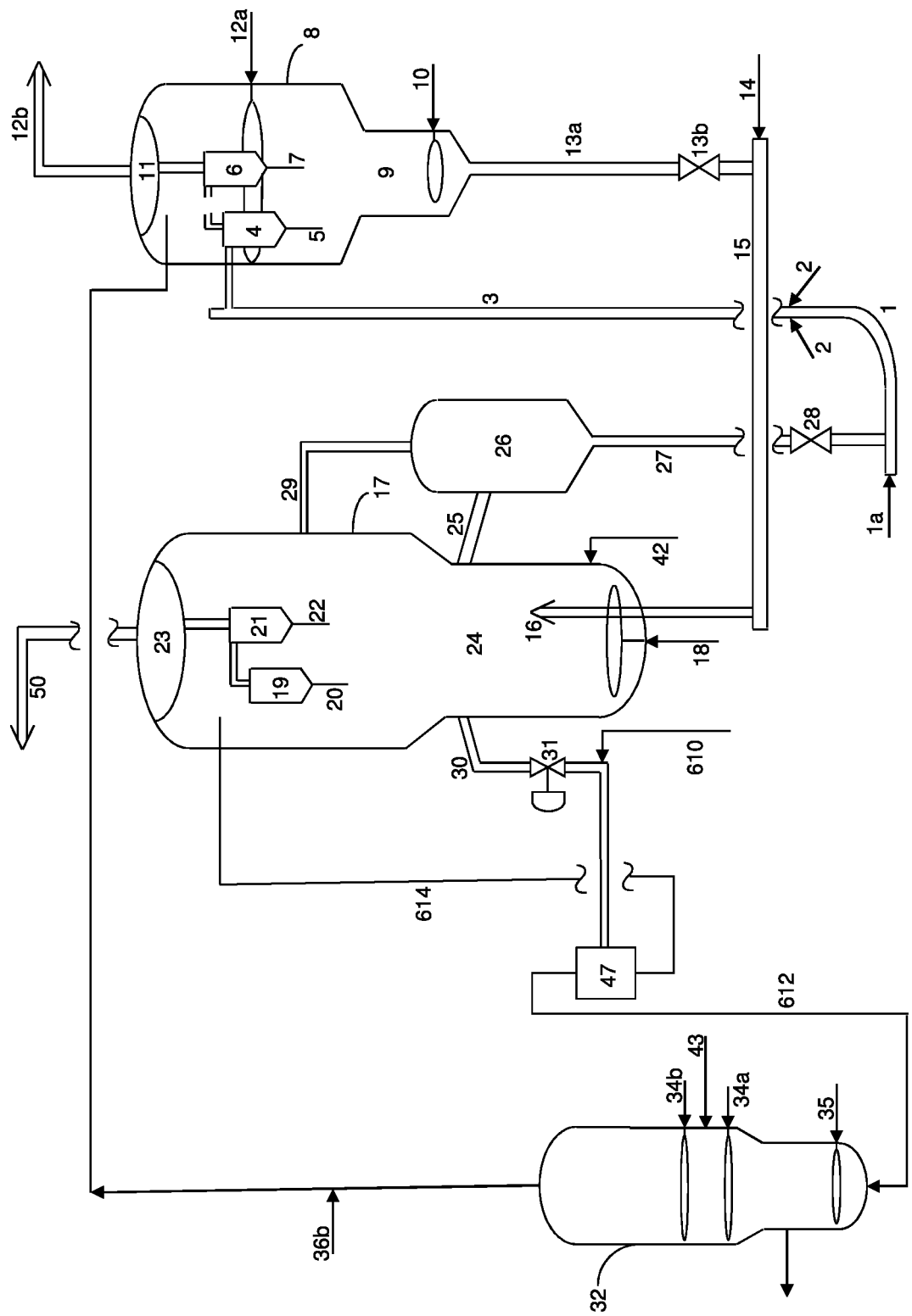
FIG. 9B is a simplified process flow diagram of a system for cracking hydrocarbons and producing light olefins according to one or more embodiments disclosed herein.

FIGS. 8A and 8B further illustrate a system with a vessel 510 accumulating/concentrating large particles for use in the secondary reactor. Where a single-pass separation may suffice, the containment vessel 510 may be excluded from the system, as illustrated in FIGS. 9A and 9B, where like numerals represent like parts. In these embodiments, the catalyst mixture is fed directly from the catalyst regenerator 17 via dip leg 30 to separator 47. Air or other fluidization gases may be supplied via flow line 610, provided at a flow rate sufficient for the inertial separations. The smaller/lighter particles may be recovered via flow line 612 and the larger and/or heavier particles may be recovered via flow line 614. FIG. 9A illustrates the larger and/or heavier particles being forwarded to secondary reactor 32, whereas FIG. 9B illustrates the smaller and/or lighter particles being forwarded to secondary reactor 32.

FIGS. 9A and 9B illustrate return of a particle portion to the regenerator 17. Similar to the above description with respect to FIGS. 8A and 8B, the particles not fed to reactor 32 may be returned to either the regenerator 17 or the disengagement vessel 8, and such may depend on the fluidization medium and/or downstream processing capabilities.

The process schemes illustrated in FIGS. 9A and 9B use a single pass version of the separator as opposed to those versions that incorporate recycle to increase the concentration. In this scheme, the regenerated catalyst is directed to the separator where either the bottoms or overhead of the separator can be directed to the secondary reactor. If the bottoms were to be directed, the catalyst would be enriched based on the larger and/or denser particles. If the overhead of the separator were to be directed to the secondary reactor, the catalyst would be enriched in the smaller and/or less dense particles. This scheme could also be arranged such that no secondary reactor is present, and the separator is between the regenerator and the primary riser reactor, concentrating a catalyst similar to that described for the process of FIG. 11, below.

The embodiments of FIGS. 8A/B decouple the recycle catalyst from the secondary reactor, achieving a higher concentration of the desired catalyst in the secondary reactor, however requiring additional capital costs. The embodiments of 6A/B also decouple the recycle catalyst from the secondary reactor, achieving a moderate increase in concentration of the desired catalyst as compared to the flow scheme of FIG. 7, for example, but at a lower capital cost than the embodiment of FIGS. 9A/B.

Figure 10:
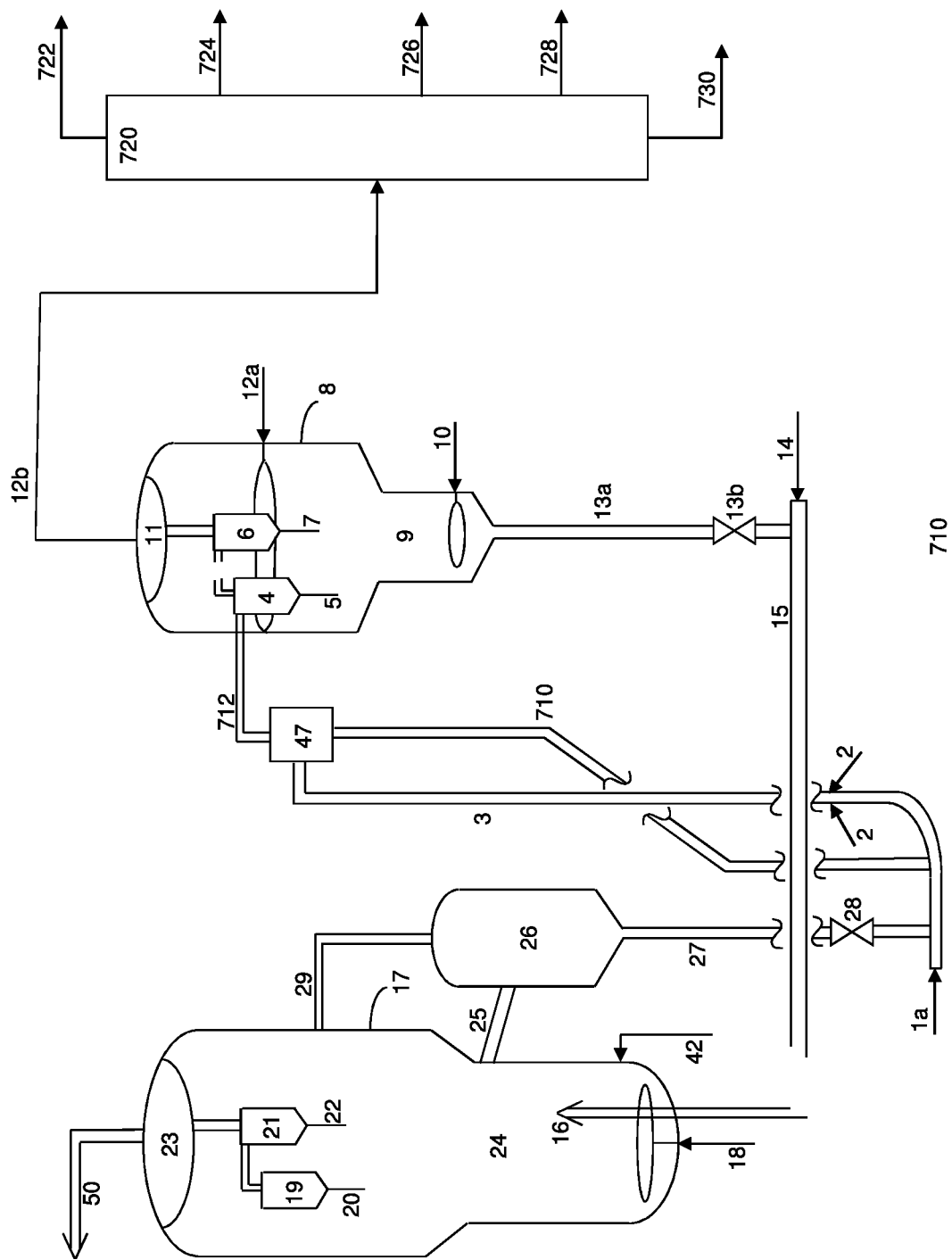
FIG. 10 is a simplified process flow diagram of a system for cracking hydrocarbons and producing light olefins according to one or more embodiments disclosed herein.

Referring now to FIG. 10, a simplified process flow diagram of systems for processing hydrocarbons according to embodiments disclosed herein is illustrated, where like numerals represent like parts. This process schemes removes the secondary reactor and has the separator 47 receiving an effluent from the primary riser 3. The riser effluent, which contains a mixed catalyst, could be directed to the separator 47 where a portion of catalyst is recycled to the riser 3 from the separator bottoms 710, thereby enriching the concentration of the larger and/or heavier catalyst in the riser reactor 3. The overhead 712 of the separator 47 would continue to the stripper vessel 8, where the hydrocarbon products would be separated from the remaining catalyst. This configuration could also be used with a catalyst mixture with no degree of classification as a method of recycling spent catalyst to the riser 3.

The enriched catalyst fraction 710 may be introduced to the riser 3 upstream or downstream (as illustrated) of the regenerated catalyst feed inlet from standpipe 27, and in some embodiments may be introduced at one or more points along the length of the riser reactor 3. The inlet point may be based on secondary hydrocarbon feeds, temperature of the recirculating catalyst 710, and other variables that may be used to advantageously process hydrocarbons in the riser reactor 3.

The hydrocarbon products recovered from disengagement vessel 8/stripper 9 may be forwarded, as described above, to a fractionator/gas plant 720, for separation and recovery of one or more hydrocarbon fractions 722, 724, 726, 728, 730. One or more of the recovered hydrocarbon fractions from the fractionator/gas plant in embodiments herein may be recirculated to the riser reactor 3 or secondary reactor 32 for further processing.

a simplified process flow diagram of systems for processing hydrocarbons according to embodiments disclosed herein is illustrated, where like numerals represent like parts. In this process scheme, a regenerator catalyst hopper 26 is fluidly connected to riser reactor 3. Regenerated mixed catalyst, which contains a smaller and/or less dense catalyst and a larger and/or denser catalyst, flows from the regenerator 17 to the regen catalyst hopper 26. The hopper 26 is fluidized with steam and/or air, provided by distributor 810. The overhead effluent 816 of the hopper flows to the separator 47. In the separator 47, which is a separation device as described previously, the catalysts are separated, and the bottoms 814, which is enriched in the larger and/or denser catalyst, may be fed back to the regen catalyst hopper 26, such as when fluidized with air, or to disengagement vessel 8, such as when fluidized with steam. This will increase the concentration of the larger and/or denser catalyst in the regen catalyst hopper 26. The overhead 812 of the separator 47 may be directed to either the regenerator or the stripper vessel. The bottom 27 of the regenerator catalyst hopper has a withdrawal with slide valve 28 which controls the flow of catalyst which is enriched in the larger and/or denser catalyst to the riser 3. In this manner, the riser 3 operates with an effective higher concentration of catalyst than the inventory in the system, creating preferential products based on the properties of the catalyst.

Concentration of a catalyst in the regen catalyst hopper as described above with respect to FIG. 11 may be performed intermittently. The system may circulate the catalyst mixture through the riser, stripper, and regenerator, without sufficient fluidization in the hopper 26 to entrain catalysts to the separator 47. When there is a change in the desired product mixture, the hydrocarbon feeds, or other factors, where it may be advantageous to operate with a higher concentration of a particular catalyst in the catalyst mixture, the catalyst in the regen hopper 26 may be fluidized and separated using separator 47. When factors again change, fluidization of the catalyst hopper may be discontinued. In this manner, the flexibility of the system with regard to products and feed may be enhanced.

Figure 11:
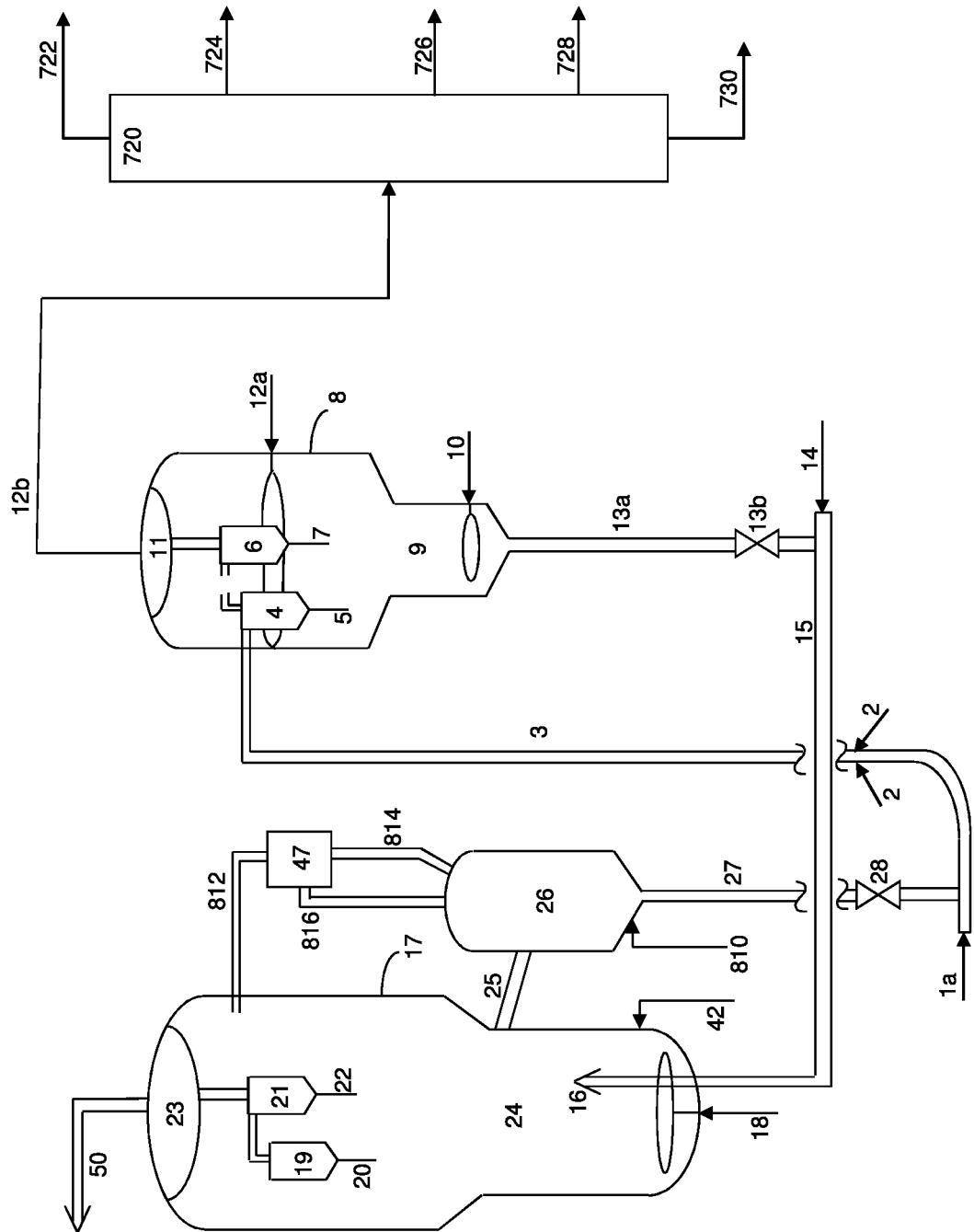
FIG. 11 is a simplified process flow diagram of a system for cracking hydrocarbons and producing light olefins according to one or more embodiments disclosed herein.

While FIGS. 10 and 11 are illustrated with a single riser, the solids separation device may be used to enhance the performance of a multiple riser system. For example, a two-riser system may benefit from the concentration of one catalyst in a riser, which may be processing different feeds than a second riser.

Embodiments herein may utilize various types of catalysts or particles to perform desired reactions, where a common regenerator may be used to regenerate the mixture of catalysts, and a separator is advantageously located to enrich one or more reactors with a particular catalyst contained in the mixture of catalysts. Embodiments herein may be used to improve unit operations, and enhance the selectivity and flexibility of the reaction systems, such as for applications including light olefins production, gasoline desulfurization, and heavy oil processing.

Light olefins production may include various light, medium, and heavy hydrocarbon feeds to the riser, as described above. Feeds to the second reactor 32 may include naphtha, such as straight run naphtha or recycle cat naphtha, among other feeds. The catalyst mixture for light olefins production may include a smaller and/or less dense catalyst, such as an FCC catalyst (zeolite Y, for example), and a heavier/denser catalyst, such as ZSM-5 or ZSM-11, among other combinations. Other cracking catalysts may also be used Various catalysts for the cracking of hydrocarbons are disclosed in U.S. Pat. Nos. 7,375,257, 7,314,963, 7,268,265, 7,087,155, 6,358,486, 6,930,219, 6,809,055, 5,972,205, 5,702,589, 5,637,207, 5,534,135, and 5,314,610, among others.

Embodiments directed toward gasoline desulfurization may include various light, medium, and heavy hydrocarbon feeds to the riser, as described above. Feeds to the second reactor 32 may also include naphtha, such as straight run naphtha or recycle cat naphtha, among other feeds. The catalyst mixture for light olefins production may include a smaller and/or less dense catalyst, such as an FCC catalyst (zeolite Y, for example), and a larger and/or denser catalyst, with desulfurization functionality such as a $MgO/Al_2O_3$ with various metals promotion. Other desulfurization catalysts may also be used as disclosed in U.S. Pat. Nos. 5,482,617, 6,482,315, 6,852,214, 7,347,929 among others. In some embodiments, the catalyst mixture may include a cracking catalyst composition having desulfurization activity, such as those disclosed in U.S. Pat. No. 5,376,608, among others.

Embodiments directed toward heavy oil processing may include various light, medium, and heavy hydrocarbon feeds to the riser, as described above. Feeds to the second reactor 32 may include hydrocarbons or hydrocarbon mixtures having boiling points or a boiling range above about 340° C. Hydrocarbon feedstocks that may be used with processes disclosed herein may include various refinery and other hydrocarbon streams such as petroleum atmospheric or vacuum residua, deasphalted oils, deasphalter pitch, hydrocracked atmospheric tower or vacuum tower bottoms, straight run vacuum gas oils, hydrocracked vacuum gas oils, fluid catalytically cracked (FCC) slurry oils, vacuum gas oils from an ebullated bed hydrocracking process, shale-derived oils, coal-derived oils, tar sands bitumen, tall oils, bio-derived crude oils, black oils, as well as other similar hydrocarbon streams, or a combination of these, each of which may be straight run, process derived, hydrocracked, partially desulfurized, and/or partially demetallized streams. In some embodiments, residuum hydrocarbon fractions may include hydrocarbons having a normal boiling point of at least 480° C., at least 524° C., or at least 565° C. The catalyst mixture for heavy hydrocarbon processing may include a smaller and/or less dense catalyst, such as an FCC catalyst (zeolite Y, for example), and a larger and/or denser catalyst, such as an active matrix catalyst, a metals trapping catalyst, a coarse/dense Ecat (equilibrium catalyst), a matrix or binder type catalyst (such as kaolin or sand) or a high matrix/zeolite FCC catalyst. Other cracking catalysts may also be used, such as, for example, one or more of those disclosed in U.S. Pat. Nos. 5,160,601, 5,071,806, 5,001,097, 4,624,773, 4,536,281, 4,431,749, 6,656,347, 6,916,757, 6,943,132, and 7,591,939, among others.

Systems herein may also be utilized for pre-treatment of a heavy crude or virgin crude, such as a crude oil or bitumen recovered from tar sands. For example, reactor 32, such as that in FIG. 1 or 9, among others, may be used to pre-treat the bitumen, prior to further processing of the treated heavy crude in downstream operations, which may include separation in a downstream separation system and recycle of one or more fractions for further conversion in reactor 3. The ability to pre-treat the heavy crude with a preferred particle within a particle or catalyst mixture may advantageously allow integration of heavy crude processing where it otherwise would be detrimental to catalyst and overall system performance.

Embodiments herein describe the catalyst mixture being separated by the separator and the effective preferential concentration of a catalyst within the mixture in a reactor. As illustrated in the Figures, the catalyst being concentrated in the reactor is illustrated as being returned from the separator proximate the top of the reactor or vessel. Embodiments herein also contemplate return of the catalyst from the separator to a middle or lower portion of the reactor, and where the catalyst is returned may depend on the hydrocarbon feeds being processed, the catalyst types in the mixture, and the desired catalyst gradient within the reactor vessel. Embodiments herein also contemplate return of the catalyst to multiple locations within the reactor. While providing the ability to enhance the concentration of a particular catalyst or particle within a mixture in a given reactor, embodiments herein may also be used for a one catalyst system; the particle separators and systems described herein may increase the catalyst/oil ratio, which enhances catalytic contact time As described for embodiments above, a second reactor is integrated with a FCC riser reactor and separation system. This reactor is in flow communication with other vessels, allowing selective catalytic processing and integrated hydrocarbon product quenching, separation and catalyst regeneration. Such an integrated reactor system offers one or more of the above advantages and features of embodiments of the processes disclosed herein may provide for an improved or optimal process for the catalytic cracking of hydrocarbons for light olefin production.

Embodiments herein may employ two types of catalyst particles, such as Y-zeolite/FCC catalyst of smaller particle size and/or less density and ZSM-5 particles larger in size and/or denser than the former. A separator with selective recycle may be utilized to preferentially segregate the Y-zeolite from ZSM-5 catalyst. Use of such catalyst system allows entrainment of lighter and smaller particles, thereby retaining ZSM-5 type particles within the additional new reactor bed. The reactants undergo selective catalytic cracking in presence of ZSM-5 type catalyst that is preferred to maximize the yield of light olefins from $C_4$ and naphtha feed streams. The separator is a device which can facilitate the separation of two types of catalysts due to the difference in their particle size and/or density. Examples of separators with selective recycle may be a cyclone separator, a screen separator, mechanical sifters, a gravity chamber, a centrifugal separator, an in-line or pneumatic classifier, or other types of separators useful for efficiently separating particles based on size and/or hydrodynamic properties. The separator is connected to the top of the second reactor which is in flow communication with second reactor as well as regenerator and first reactor/stripper.

The reactor may be provided with baffles or modular grid internals. This provides intimate contact of catalyst with hydrocarbon feed molecules, helps in bubble breakage and avoiding bubble growth due to coalescence, channeling or bypassing of either catalyst or feed.

Conventionally, fresh catalyst make-up for maintaining the catalyst activity is introduced to the regenerator bed using plant air. In contrast, it is proposed to inject the desired high concentration catalyst/additive directly into the second reactor bed using steam or nitrogen as conveying media. This helps to produce incremental increases in concentration and favorable selectivity.

The reactor configurations described herein provide enough flexibility and operating window to adjust operating conditions such as weight hourly space velocity (WHSV), catalyst and hydrocarbon vapor residence time, reaction temperature, catalyst/oil ratio, etc. As for example, in some embodiments, the second reactor top/bed temperature is controlled by adjusting catalyst flow from regenerator which indirectly controls the catalyst/oil ratio. Whereas reactor bed level may be controlled by manipulating the spent catalyst flow from reactor to regenerator, which controls the WHSV and catalyst residence time.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for the conversion of hydrocarbons, comprising:
   regenerating a catalyst mixture comprising a first catalyst and a second particle in a regenerator, wherein the first catalyst has a smaller average particle size and/or is less dense than the second particle, and wherein the second particle may be catalytic or non-catalytic to produce a regenerated catalyst mixture;
   feeding a portion of the regenerated catalyst mixture and hydrocarbons to a riser reactor to convert at least a portion of the hydrocarbons and recover a first effluent comprising the catalyst mixture and converted hydrocarbons;
   feeding another portion of the regenerated catalyst mixture to a second reactor;
   feeding a hydrocarbon feedstock to the second reactor and fluidizing the catalyst mixture;
   recovering an overhead product from the second reactor comprising the second particle, the first catalyst, and a reacted hydrocarbon product;
   separating the second particle from the overhead product to provide a first stream comprising the first catalyst and the reacted hydrocarbon product and a second stream comprising the separated second particle;
   returning the separated second particle in the second stream to the second reactor.

2. The process of claim 1, wherein the first catalyst is a cracking catalyst and the second particle is a desulfurization catalyst.

3. The process of claim 1, wherein the first catalyst is an FCC cracking catalyst and the second particle is a heavy hydrocarbon treatment additive.

4. The process of claim 1, wherein the first catalyst is zeolite Y and the second particle comprises ZSM-5 or ZSM-11.

5. The process of claim 1, further comprising:
   feeding the first stream and the first effluent to a disengagement vessel;
   separating the first catalyst and second particle from the hydrocarbons in the first stream and first effluent;
   feeding the separated first catalyst and second particle to the regenerator.

6. The process of claim 5, further comprising fractionating the hydrocarbons separated from the first and second catalyst to produce two or more hydrocarbon fractions.

7. The process of claim 6, further comprising feeding at least one of the two or more hydrocarbon fractions to one or both the riser reactor and the second reactor.

* * * * *